(12) United States Patent
Tsuge

(10) Patent No.: US 6,329,078 B1
(45) Date of Patent: Dec. 11, 2001

(54) MAGNETORESISTIVE ELEMENT AND METHOD OF FORMING THE SAME

(75) Inventor: Hisanao Tsuge, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/182,896

(22) Filed: Oct. 30, 1998

(30) Foreign Application Priority Data

Oct. 30, 1997 (JP) .................................................. 9-298566

(51) Int. Cl.$^7$ ................................. G11B 5/39; G11B 5/66
(52) U.S. Cl. ......................... 428/678; 428/677; 428/928; 360/113
(58) Field of Search ...................................... 428/611, 928, 428/632, 678, 692, 693; 360/113

(56) References Cited

U.S. PATENT DOCUMENTS

| | | | |
|---|---|---|---|
| 5,650,958 | * | 7/1997 | Gallagher et al. . |
| 5,764,567 | * | 6/1998 | Parkin . |
| 5,835,314 | * | 11/1998 | Moodera et al. . |
| 5,841,692 | * | 11/1998 | Gallagher et al. . |
| 5,862,022 | * | 1/1999 | Noguchi et al. . |
| 5,976,713 | * | 11/1999 | Fuke et al. . |
| 5,986,858 | * | 11/1999 | Sato et al. . |
| 5,991,193 | * | 11/1999 | Gallagher et al. . |
| 6,034,887 | * | 3/2000 | Gupta et al. . |

FOREIGN PATENT DOCUMENTS

| | | |
|---|---|---|
| 9-288807 | 11/1997 | (JP) . |
| 11-112054 | 4/1999 | (JP) . |

OTHER PUBLICATIONS

Tezuka et al., *Journal of the Magnetics Society of Japan*, "Magnetic Tunneling Effect in Ferromagnet/$Al_2O_3$/ Ferromagnet Junctions", vol. 19, No. 2, 1995, pp. 369–372.

Tanaka et al. *Journal of Applied Physics*, "Magnetoresistance in Ferromagnet–Insulator–Ferromagnet Tunnel Junctions with Half–Metallic Ferromagnet NiMnSb Compound," vol. 81, No. 8, Apr. 15, 1997, pp. 5515–5517.

The $21^{st}$ Annual Meeting of Magnetics Society of Japan, "Creation of Ferromagnetic Tunnel Junction By Oxygen Plasma Electric Discharge", 1997, p. 168. (no month).

* cited by examiner

*Primary Examiner*—Blaine Copenheaver
*Assistant Examiner*—Jason Savage
(74) *Attorney, Agent, or Firm*—Young & Thompson

(57) ABSTRACT

A ferromagnetic tunnel junction structure includes an anti-ferromagnetic layer; a first ferromagnetic layer in contact with the anti-ferromagnetic layer; a tunnel barrier layer in contact with the first ferromagnetic layer; a second ferromagnetic layer in contact with the tunnel barrier layer so that the tunnel barrier layer is sandwiched between the first and second ferromagnetic layer, the second ferromagnetic layer includes at least a high polarization layer and at least a soft magnetic layer so that the high polarization layer is positioned closer to the tunnel barrier layer than the soft magnetic layer.

73 Claims, 24 Drawing Sheets

MAGNETORESISTIVE ELEMENT AND METHOD OF FORMING THE SAME

BACKGROUND OF THE INVENTION

The present invention relates to an improved magnetoresistive element and a method of forming the same, and more particularly to a novel ferromagnetic tunnel junction multilayer structure in a magnetoresistive element and a method of forming a tunnel barrier layer in the ferromagnetic tunnel junction multilayer structure.

The ferromagnetic tunnel junction structure has a tunnel barrier layer sandwiched between first and second ferromagnetic layers, wherein the tunnel barrier layer comprises a thin insulation layer having a thickness of a few nanometers. A constant current is applied between the first and second ferromagnetic layers through the tunnel barrier layer, during which an external magnetic field is applied in a direction parallel to the ferromagnetic tunnel unction interface so as to cause a magnetoresistance effect phenomenon, wherein a resistance is varied depending upon a relative angle of both magnetization directions of the first and second ferromagnetic layers. If the both magnetization directions of the first and second ferromagnetic layers are parallel to each other, then the resistance is minimum. If the both magnetization directions of the first and second ferromagnetic layers are anti-parallel to each other, then the resistance is maximum. A difference in coercive force between the first and second ferromagnetic layers causes variations in relative angle in the range from parallel to anti-parallel of the both magnetization directions of the first and second ferromagnetic layers in accordance with the intensity of the external magnetic field. This permits a detection of variations in intensity of the external magnetic field by detecting the variation in resistance. The sensitivity of the magnetic field depends upon a magnetoresistance ratio which is defined by 2P1P2/(1-P1P2), where P1 and P2 are polarization of the first and second ferromagnetic layers. As the polarization of each of the first and second ferromagnetic layers is large, the magnetoresistance ratio is large.

In recent years, the quality of the tunnel barrier layer has been improved, whereby a ferromagnetic tunnel junction exhibiting a high magnetoresistance ratio of about 20% which is near the theoretical value could be obtained. This is disclosed in Journal of Applied Physics, vol. 79, pp. 4724–4729, 1996. This conventional ferromagnetic tunnel junction will be described as follows. FIG. 1 is a fragmentary cross sectional elevation view illustrative of a conventional ferromagnetic tunnel junction structure formed on a substrate. A CoFe ferromagnetic layer 122 is provided on a substrate 121. An alumina tunnel barrier layer 123 is provided on the CoFe ferromagnetic layer 122. A Co ferromagnetic layer 124 is provided on the alumina tunnel barrier layer 123, so that the alumina tunnel barrier layer 123 is sandwiched between the CoFe ferromagnetic layer 122 and the Co ferromagnetic layer 124.

FIGS. 2A through 2D are fragmentary cross sectional elevation views illustrative of a process of forming the above conventional ferromagnetic tunnel junction structure.

With reference to FIG. 2A, a CoFe ferromagnetic layer 132 is selectively evaporated on a glass substrate 131 in a vacuum by use of a first mask.

With reference to FIG. 2B, an aluminum layer 133 having a thickness in the range of 1.2–2.0 nanometers is selectively evaporated on the CoFe ferromagnetic layer 132 and the glass substrate 131 in a vacuum by use of a first mask.

With reference to FIG. 2C, the aluminum layer 133 is exposed to an oxygen glow discharge to form an alumina tunnel barrier layer 134.

With reference to FIG. 2D, a Co ferromagnetic layer 135 is grown so that the Co ferromagnetic layer 135 has a longitudinal direction perpendicular to a longitudinal direction of the CoFe ferromagnetic layer 132, thereby forming a cross-shaped electrode ferromagnetic tunnel junction device.

The maximum magnetoresistance ratio is 18%.

Other conventional ferromagnetic tunnel junction devices are disclosed in Japanese laid-open patent publication Nos. 5-63254, 6-244477, 8-70148, 8-70149 and 8-316548 as well as 1997 Japan applied magnetics vol. 21, pp. 493–496. The structures of the other conventional ferromagnetic tunnel junction devices are the same as described above. Further, the fabrication process of the other conventional ferromagnetic tunnel junction devices are different from the above described fabrication processes only in that The alumina tunnel barrier layer is formed by exposing an aluminum layer to an atmosphere.

In the meantime, a spin valve structure has been known as being applicable to the magnetic head. The spin valve structure has an electrically conductive and non-magnetic layer sandwiched between first and second ferromagnetic layers, wherein an anti-ferromagnetic layer is provided in contact with the first ferromagnetic layer so that the first ferromagnetic layer serves as a pinned layer whilst the second ferromagnetic layer serves as a free layer. A magnetization direction of the pinned layer is set vertical to a surface of the magnetic medium whilst a magnetization direction of the free layer is set parallel to the surface of the magnetic medium. A leaked magnetic field from the magnetic medium causes change in magnetization direction of the free layer, whilst the magnetization direction of the pinned layer is pinned or remains unchanged, for which reason the leaked magnetic field from the magnetic medium causes change in relative angle between the magnetization directions of the free layer and the pinned layer. The change in relative angle between the magnetization directions of the free layer and the pinned layer causes a variation in resistance of the device. The variation in intensity of the leaked magnetic field can be detected by detecting the variation in resistance of the device.

It has been known in the art to which the present invention pertains that free layer is defined to be a layer which magnetization direction is likely to be changed by an applied external magnetic field as compared to the pinned layer, whilst the pinned layer is defined to be a layer which magnetization direction is unlikely to be changed by the applied external magnetic field as compared to the free layer. If, for example, no anti-ferromagnetic layer is provided adjacent to the pinned layer, then the ferromagnetic tunnel junction devices does not utilize the exchange-coupling field. In this case, a layer having a smaller coercive force serves as the free layer, whilst another layer having a larger coercive force serves as the pinned layer.

The above tunnel barrier layer of the ferromagnetic tunnel junction device is electrically insulative, so that the current flows across the tunnel barrier layer or in the vertical direction of the junction interface. On the other hand, the intermediate layer between the pinned layer and the free layer of the spin valve structure is electrically conductive, so that the current flows along the junction interface or in the parallel direction to the junction interface. The ferromagnetic tunnel function device and the spin valve structure are common in utilizing the exchange-coupling magnetic field.

In order to apply the magnetoresistive element to the magnetic head, a highly sensitive and stable detection of the leaked magnetic field from the magnetic medium. The first and second ferromagnetic layers of the conventional ferromagnetic tunnel junction devices comprise single layered structures. In order to obtain a large magnetoresistance ratio for high sensitivity, it is required that the first and second ferromagnetic layers have large polarizations are generally large, for example, several tends Oe. For the reason, if the ferromagnetic tunnel junction device has a similar structure to the spin valve structure in order to utilize the exchange-coupling magnetic field, then a remarkable hysteresis characteristic appears on the magnetoresistance curve. This means it difficult to conduct a stable magnetic signal detection.

In order to apply the magnetoresistive element to the magnetic heads, it is required to reduce a resistance of the tunnel barrier layer for reduction of the thermal noise. It was difficult for the conventional fabrication method to reduce a resistance of the tunnel barrier layer.

A signal output voltage level is the key for high density magnetic head. It was also difficult for the conventional technique to obtain a sufficiently high current density and to reduce the resistance without deterioration in characteristics of the device.

It was also difficult for the conventional technique to suppress variations in characteristics of the devices in wafer or between lots for sufficiently high yield.

It may be considered that the above difficulties are caused by the conventional method of forming the tunnel barrier layer. If the oxygen glow discharge is used, then active oxygen as ion or radical is used for oxidation of the conductive layer, for which reason it is difficult to control a thickness of the thin oxide tunnel barrier layer. Since the resistance of the tunnel barrier layer depends upon the thickness of the thin oxide tunnel barrier layer, the difficulty to control a thickness of the tin oxide tunnel barrier layer means it difficult to control the resistance of the tunnel barrier layer. Further, activated impurity gases causes contamination of the tunnel barrier layer, thereby deterioration in quality of the tunnel barrier layer. If the exposure of the conductive layer to the atmosphere is carried out, then dusts in the atmosphere causes formation of pin holes in the tunnel barrier layer. The tunnel barrier layer may also be contaminated with moisture, carbon oxide and nitrogen oxide.

SUMMARY OF THE INVENTION

Accordingly, it is an object of the present invention to provide a novel magnetoresistive element free from the above problems.

It is a further object of the present invention to provide a novel magnetoresistive element which is capable of highly sensitive and stable detection of a signal magnetic field.

It is a still further object of the present invention to provide a novel ferromagnetic tunnel junction structure free from the above problems.

It is yet a further object of the present invention to provide a novel ferromagnetic tunnel junction structure of a magnetoresistive element which is capable of highly sensitive and stable detection of a signal magnetic field.

It is a further more object of the present invention to provide a novel method of forming a magnetoresistive element having desired signal output voltage characteristics.

It is still more object of the present invention to provide a novel method of forming a low-resistive and thickness-controlled tunnel barrier layer of a ferromagnetic tunnel junction structure.

It is moreover object of the present invention to provide a novel method of forming a magnetoresistive element at a high yield.

The first present invention provides a ferromagnetic tunnel junction structure comprising: an anti-ferromagnetic layer; a first ferromagnetic layer in contact with the anti-ferromagnetic layer; a tunnel barrier layer in contact with the first ferromagnetic layer; a second ferromagnetic layer in contact with the tunnel barrier layer so that the tunnel barrier layer is sandwiched between the first and second ferromagnetic layer, wherein the second ferromagnetic layer includes at least a high polarization layer and at least a soft magnetic layer so that the high polarization layer is positioned closer to the tunnel barrier layer than the soft magnetic layer.

The provision of the high polarization layer relatively close to or adjacent to or in contact with the tunnel barrier layer permits the novel ferromagnetic tunnel junction structure to exhibit a large magnetoresistance ratio. If, contrary to the present invention, the high polarization layer were positioned far from the tunnel barrier layer, then the efficiency of increase in magnetoresistance ratio of the ferromagnetic tunnel junction structure is remarkably reduced. In order to keep the high efficiency of increase in magnetoresistance ratio of the ferromagnetic tunnel junction structure, it is, therefore, preferable that the high polarization layer is positioned relatively close to or adjacent to or in contact with the tunnel barrier layer. In the meantime, the high polarization layer has a coercive force which is high than a coercive force of the soft magnetic layer. If, contrary to the present invention, the free layer were designed to comprise only a single high polarization layer to obtain a possible increased magnetoresistance ratio, then the coercive force is too large to comply with the requirements. In accordance with the present invention, however, the soft magnetic layer is provided so that the high polarization layer is closer to the tunnel barrier layer than the soft magnetic layer. The provision of the soft magnetic layer keeps a small coercive force or prevents any large increase in coercive force. For the above reasons, the multilayer structure provides a large polarization or a large magnetoresistance ratio and a small coercive force.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
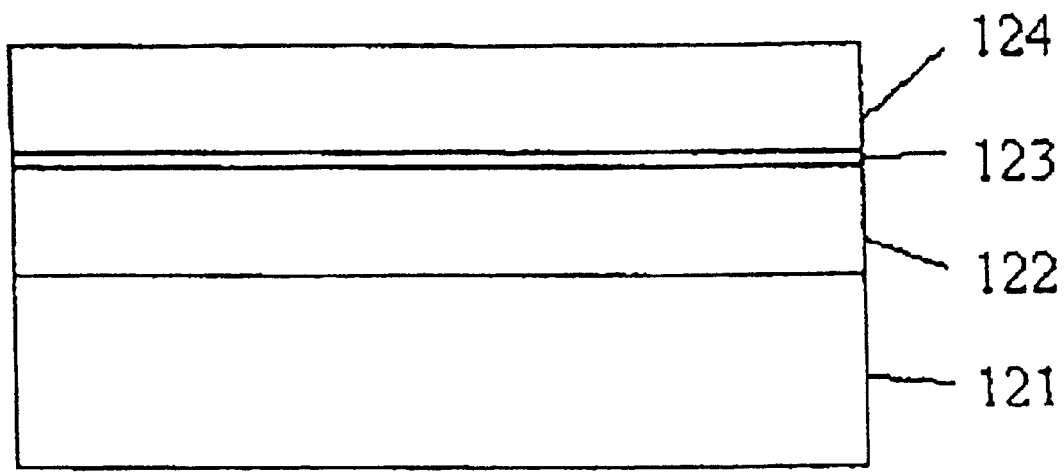
FIG. 1 is a fragmentary cross sectional elevation view illustrative of a conventional ferromagnetic tunnel junction structure formed on a substrate.
Figure 2A:
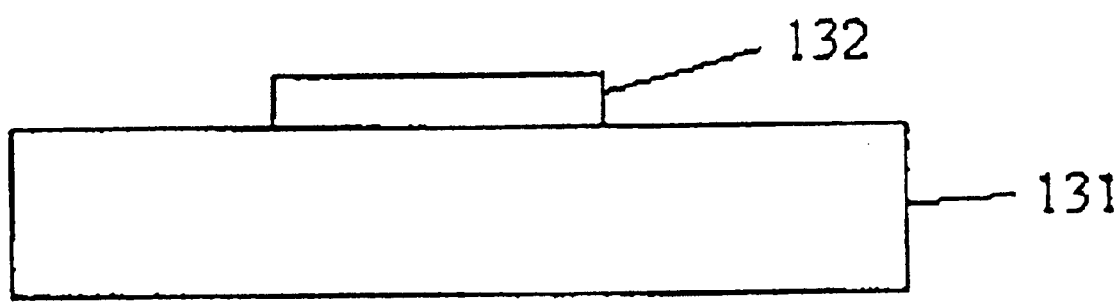
FIGS. 2A through 2D are fragmentary cross sectional elevation views illustrative of a process of forming the above conventional ferromagnetic tunnel junction structure.
Figure 2B:
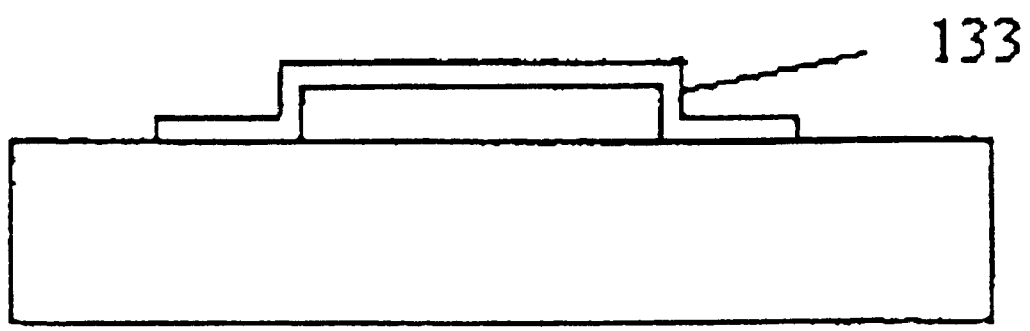
Figure 2C:
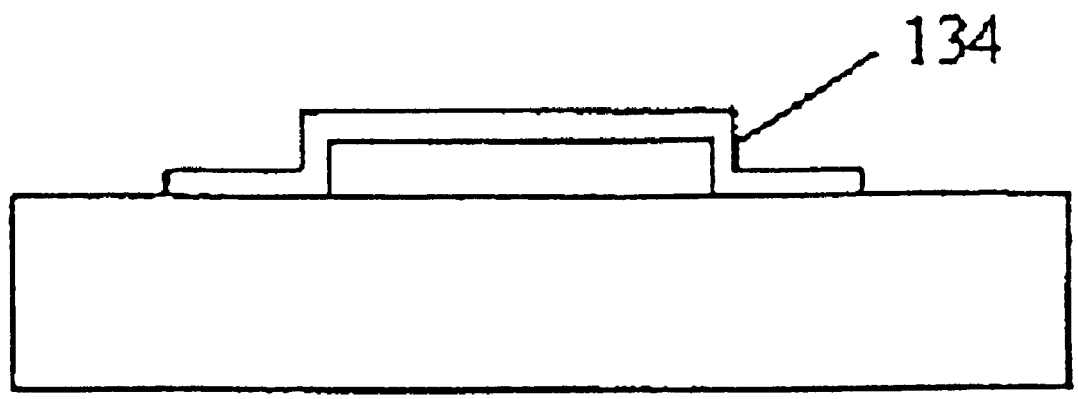
Figure 2D:
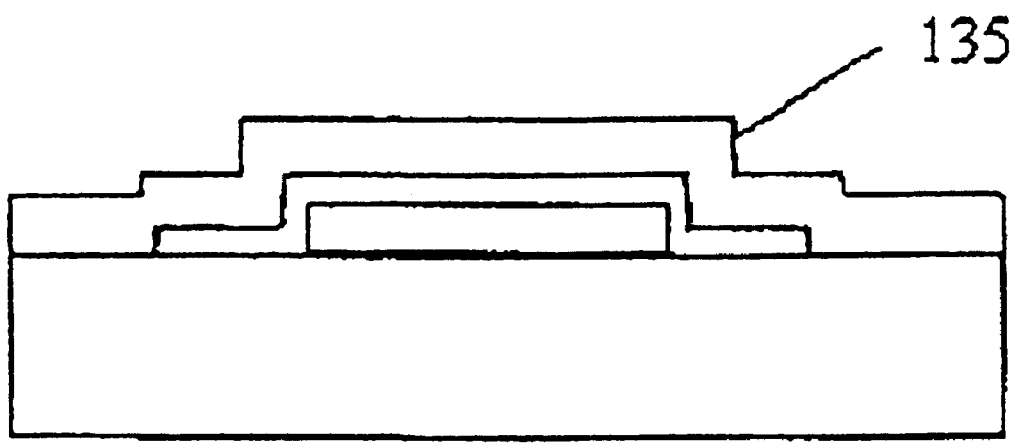

The first present invention provides a ferromagnetic tunnel junction structure comprising: an anti-ferromagnetic layer; a first ferromagnetic layer in contact with the anti-ferromagnetic layer; a tunnel barrier layer in contact with the first ferromagnetic layer; a second ferromagnetic layer in contact with the tunnel barrier layer so that the tunnel barrier layer is sandwiched between the first and second ferromagnetic layer, wherein the second ferromagnetic layer includes at least a high polarization layer and at least a soft magnetic layer so that the high polarization layer is positioned closer to the tunnel barrier layer than the soft magnetic layer.

The provision of the high polarization layer relatively close to or adjacent to or in contact with the tunnel barrier layer permits the novel ferromagnetic tunnel junction structure to exhibit a large magnetoresistance ratio. If, contrary to the present invention, the high polarization layer were positioned far from the tunnel barrier layer, then the efficiency of increase in magnetoresistance ratio of the ferromagnetic tunnel junction structure is remarkably reduced. In order to keep the high efficiency of increase in magnetoresistance ratio of the ferromagnetic tunnel junction structure, it is, therefore, preferable that the high polarization layer is positioned relatively close to or adjacent to or in contact with the tunnel barrier layer. In the meantime, the high polarization layer has a coercive force which is high than a coercive force of the soft magnetic layer. If, contrary to the present invention, the free layer were designed to comprise only a single high polarization layer to obtain a possible increased magnetoresistance ratio, then the coercive force is too large to comply with the requirements. In accordance with the present invention, however, the soft magnetic layer is provided so that the high polarization layer is closer to the tunnel barrier layer than the soft magnetic layer. The prevision of the soft magnetic layer keeps a small coercive force or prevents any large increase in coercive force. For the above reasons, the multilayer structure provides a large polarization or a large magnetoresistance ratio and a small coercive force.

It is preferable that the high polarization layer includes $Co_xFe_{1-x}$ ($0 \leq x < 1$).

It is also preferable that the high polarization layer includes $Ni_xFe_{1-x}$ ($0 \leq x \leq 0.35$).

It is also preferable that the high polarization layer includes at least an intermetallic compound having a prefect spin polarization.

It is further preferable that the intermetallic compound comprises semi-metals.

It is furthermore preferable that the intermetallic compound comprises NiMnSb.

It is also preferable that the high polarization layer has a thickness of not more than 10 nanometers.

It is further preferable that the high polarization layer has a thickness of not more than 5 nanometers.

It is also preferable that the high polarization layer has a magnetic moment which is higher than a magnetic moment of cobalt.

It is also preferable that the soft magnetic layer includes a permalloy $Ni_xFe_{1-x}$ ($0.35 \leq x \leq 0.8$).

It is also preferable that the tunnel barrier layer is made of an oxide of a conductor having a smaller surface free energy than a ferromagnetic material of the first ferromagnetic layer.

It is further preferable that the tunnel barrier layer is made of $Al_2O_3$.

It is also preferable that the tunnel barrier layer is made of an oxide of a conductor having a smaller surface free energy than a ferromagnetic material of the high polarization layer.

It is further preferable that the tunnel barrier layer is made of $Al_2O_3$.

It is furthermore preferable that the tunnel barrier layer has a thickness in the range of 0.4 nanometers to 2.0 nanometers.

It is also preferable that the tunnel barrier layer has a barrier height in the range of 0.4 eV to 5.0 eV.

The tunnel barrier layer comprises an insulator which may be made of an insulator having a smaller surface free energy than a ferromagnetic material of the first ferromagnetic layer, for example, may be made of $Al_2O_3$. The tunnel barrier layer has a thickness in the range of 0.4 nanometers to 2.0 nanometers and also has a barrier height in the range of 0.4 eV to 5.0 eV. If, for example, the above ferromagnetic tunnel junction structure is applied to the transducer for converting electric variation into magnetic variation such as the magnetic head, then a resistance of the tunnel barrier layer is very important for characteristics of the transducer or the magnetic head. This resistance of the tunnel barrier layer depends upon both the thickness and the barrier height. It is preferable for application to the magnetic head that the thickness and the barrier height of the tunnel barrier layer are selected in the thickness range of 0.4 nanometers to 2.0 nanometers and the barrier height range of 0.4 eV to 5.0 eV, so that the resistance of the tunnel barrier layer is not higher than $1 \times 10^{-6}$ $\Omega cm^2$. The alumina $Al_2O_3$ is preferably formed by a natural oxidation or a spontaneous oxidation of an aluminum film under a substantive thermal equilibrium state. The use of the alumina $Al_2O_3$ formed by the natural oxidation results in a large reduction in density of pin holes, thereby obtaining a high quality ferromagnetic tunnel junction. If the thickness of the aluminum layer is so thick, then a complete oxidation to the aluminum layer is difficult, whereby an unoxidized aluminum layer may remain. This unoxidized aluminum layer causes a spin scattering phenomenon. If, however, the thickness of the aluminum layer is so thin, a surface region of a base ferromagnetic layer such as a pinned layer or a free layer may be oxidized, resulting in a large drop in the magnetoresistance ration of the ferromagnetic tunnel junction device. A surface irregularity of the base ferromagnetic layer is one of the important factor to decide an optimum thickness of the aluminum layer.

It is also preferable that the first ferromagnetic layer comprises an additional soft magnetic layer.

It is furthermore preferable that the additional soft magnetic layer includes a permalloy $Ni_xFe_{1-x}$ ($0.35 \leq x \leq 0.8$).

It is also preferable that the first ferromagnetic layer comprises an additional high polarization layer.

It is further preferable that the additional high polarization layer includes $Co_xFe_{1-x}$ ($0 \leq x < 1$).

It is further preferable that the additional high polarization layer includes $Ni_xFe_{1-x}$ ($0 \leq x \leq 0.35$).

It is further preferable that the additional high polarization layer includes at least an intermetallic compound having a prefect spin polarization.

It is furthermore preferable that the intermetallic compound comprises semi-metals.

It is moreover preferable that the intermetallic compound comprises NiMnSb.

It is further preferable that the additional high polarization layer has a thickness of not more than 10 nanometers.

It is furthermore preferable that the additional high polarization layer has a thickness of not more than 5 nanometers.

It is also preferable that the first ferromagnetic layer also includes at least an additional high polarization layer and at least an additional soft magnetic layer so that the additional high polarization layer is positioned closer to the tunnel barrier layer than the soft magnetic layers.

It is further preferable that the additional high polarization layer includes $Co_xFe_{1-x}$ ($0 \leq x < 1$).

It is further preferable that the additional high polarization layer includes $Ni_xFe_{1-x}$ ($0 \leq x \leq 0.35$).

It is further preferable that the additional high polarization layer includes at least an intermetallic compound having a prefect spin polarization.

It is furthermore preferable that the intermetallic compound comprises semi-metals.

It is moreover preferable that the intermetallic compound comprises NiMnSb.

It is further preferable that the additional high polarization layer has a thickness of not more than 10 nanometers.

It is furthermore preferable that the additional high polarization layer has a thickness of not more than 5 nanometers.

It is further preferable that the additional soft magnetic layer includes a permalloy $Ni_xFe_{1-x}$ ($0.35 \leq x \leq 0.8$).

The second present invention provides a free layer in a ferromagnetic tunnel junction structure, wherein the free layer includes at least a high polarization layer and at least a soft magnetic layer so that the high polarization layer is positioned closer to the tunnel barrier layer than the soft magnetic layer.

The provision of the high polarization layer relatively close to or adjacent to or in contact with the tunnel barrier layer permits the novel ferromagnetic tunnel junction structure to exhibit a large magnetoresistance ratio. If, contrary to the present invention, the high polarization layer were positioned far from the tunnel barrier layer, then the efficiency of increase in magnetoresistance ratio of the ferromagnetic tunnel junction structure is remarkably reduced. In order to keep the high efficiency of increase in magnetoresistance ratio of the ferromagnetic tunnel junction structure, it is, therefore, preferable that the high polarization layer is positioned relatively close to or adjacent to or in contact with the tunnel barrier layer. In the meantime, the high polarization layer has a coercive force which is high than a coercive force of the soft magnetic layer. If, contrary to the present invention, the free layer were designed to comprise only a single high polarization layer to obtain a possible increased magnetoresistance ratio, then the coercive force is too large to comply with the requirements. In accordance with the present invention, however, the soft magnetic layer is provided so that the high polarization layer is closer to the tunnel barrier layer than the soft magnetic layer. The prevision of the soft magnetic layer keeps a small coercive force or prevents any large increase in coercive force. For the above reasons, the multilayer structure provides a large polarization or a large magnetoresistance ratio and a small coercive force.

It is also preferable that the high polarization layer includes $Co_xFe_{1-x}$ ($0 \leq x < 1$).

It is also preferable that the high polarization layer includes $Ni_xFe_{1-x}$ ($0 \leq x \leq 0.35$).

It is also preferable that the high polarization layer includes at least an intermetallic compound having a prefect spin polarization.

It is further preferable that the intermetallic compound comprises semi-metals.

It is furthermore preferable that the intermetallic compound comprises NiMnSb.

It is also preferable that the high polarization layer has a thickness of not more than 10 nanometers.

It is furthermore preferable that the high polarization layer has a thickness of not more than 5 nanometers.

It is also preferable that the soft magnetic layer includes a permalloy $Ni_xFe_{1-x}$ ($0.35 \leq x \leq 0.8$).

It is also preferable that the high polarization layer has a magnetic moment which is higher than a magnetic moment of cobalt.

The third present invention provide a ferromagnetic tunnel junction structure comprising: an anti-ferromagnetic layer; a first ferromagnetic layer in contact with the anti-ferromagnetic layer; a tunnel barrier layer in contact with the first ferrromagnetic layer; a second ferromagnetic layer in contact with the tunnel barrier layer so that the tunnel barrier layer is sandwiched between the first and first ferromagnetic layer, wherein the first ferromagnetic layer includes at least a high polarization layer and at least a soft magnetic layer so that the high polarization layer is positioned closer to the tunnel barrier layer than the soft magnetic layer.

The provision of the high polarization layer relatively close to or adjacent to or in contact with the tunnel barrier layer permits the novel ferromagnetic tunnel junction structure to exhibit a large magnetoresistance ratio. If, contrary to the present invention, the high polarization layer were positioned far from the tunnel barrier layer, then the efficiency of increase in magnetoresistance ratio of the ferromagnetic tunnel junction structure is remarkably reduced. In order to keep the high efficiency of increase in magnetoresistance ratio of the ferromagnetic tunnel junction structure, it is, therefore, preferable that the high polarization layer is positioned relatively close to or adjacent to or in contact with the tunnel barrier layer. In the meantime, the high polarization layer has a coercive force which is high than a coercive force of the soft magnetic layer. If, contrary to the present invention, the pinned layer were designed to comprise only a single high polarization layer to obtain a possible increased magnetoresistance ratio, then the coercive force is too large to comply with the requirements. In accordance with the present invention, however, the soft magnetic layer is provided so that the high polarization layer is closer to the tunnel barrier layer than the soft magnetic layer. The prevision of the soft magnetic layer keeps a small coercive force or prevents any large increase in coercive force. For the above reasons, the multilayer structure provides a large polarization or a large magnetoresistance ratio and a small coercive force.

It is also preferable that the high polarization layer includes $Co_xFe_{1-x}(0 \leq x<1)$.

It is also preferable that the high polarization layer includes $Ni_xFe_{1-x}(0 \leq x \leq 0.35)$.

It is also preferable that the high polarization layer includes at least an intermetallic compound having a prefect spin polarization.

It is further preferable that the intermetallic compound comprises semi-metals.

It is furthermore preferable that the intermetallic compound comprises NiMnSb.

it is also preferable that the high polarization layer has a thickness of not more than 10 nanometers.

It is further preferable that the high polarization layer has a thickness of not more than 5 nanometers.

It is also preferable that the high polarization layer has a magnetic moment which is higher than a magnetic moment of cobalt.

It is also preferable that the soft magnetic layer includes a permalloy $Ni_xFe_{1-x}(0.35 \leq x \leq 0.8)$.

It is also preferable that the tunnel barrier layer is made of an oxide of a conductor having a smaller surface free energy than a ferromagnetic material of the second ferromagnetic layer.

It is further preferable that the tunnel barrier layer is made of $Al_2O_3$.

It is also preferable that the tunnel barrier layer is made of an oxide of a conductor having a smaller surface free energy than a ferromagnetic material of the high polarization layer.

It is further preferable that the tunnel barrier layer is made of $Al_2O_3$.

it is further preferable that the tunnel barrier layer has a thickness in the range of 0.4 nanometers to 2.0 nanometers.

It is also preferable that the tunnel barrier layer has a barrier height in the range of 0.4 eV to 5.0 eV.

The tunnel barrier layer comprises an insulator which may be made of an insulator having a smaller surface free energy than a ferromagnetic material of the first ferromagnetic layer, for example, may be made of $Al_2O_3$. The tunnel barrier layer has a thickness in the range of 0.4 nanometers to 2.0 nanometers and also has a barrier height in the range of 0.4 eV to 5.0 eV. If, for example, the above ferromagnetic tunnel junction structure is applied to the transducer for converting electric variation into magnetic variation such as the magnetic head, then a resistance of the tunnel barrier layer is very important for characteristics of the transducer or the magnetic head. This resistance of the tunnel barrier layer depends upon both the thickness and the barrier height. It is preferable for application to the magnetic head that the thickness and the barrier height of the tunnel barrier layer are selected in the thickness range of 0.4 nanometers to 2.0 nanometers and the barrier height range of 0.4 eV to 5.0 eV, so that the resistance of the tunnel barrier layer is not higher than $1 \times 10^{-6}$ $\Omega cm^2$. The alumina $Al_2O_3$ is preferably formed by a natural oxidation or a spontaneous oxidation of an aluminum film under a substantive thermal equilibrium state. The use of the alumina $Al_2O_3$ formed by the natural oxidation results in a large reduction in density of pin holes, thereby obtaining a high quality ferromagnetic tunnel junction. If the thickness of the aluminum layer is so thick, then a complete oxidation to the aluminum layer is difficult, whereby an unoxidized aluminum layer may remain. This unoxidized aluminum layer causes a spin scattering phenomenon. If, however, the thickness of the aluminum layer is so thin, a surface region of a base ferromagnetic layer such as a pinned layer or a free layer may be oxidized, resulting in a large drop in the magnetoresistance ratio of the ferromagnetic tunnel junction device. A surface irregularity of the base ferromagnetic layer is one of the important factor to decide an optimum thickness of the aluminum layer.

It is also preferable that the second ferromagnetic layer comprises an additional soft magnetic layer.

It is further preferable that the additional soft magnetic layer includes a permalloy $Ni_xFe_{1-x}(0.35 \leq x \leq 0.8)$.

It is further preferable that the additional high polarization layer has a thickness of not more than 10 nanometers.

It is furthermore preferable that the additional high polarization layer has a thickness of not more than 5 nanometers.

It is also preferable that the second ferromagnetic layer also includes at least an additional high polarization layer and at least an additional soft magnetic layer so that the additional high polarization layer is positioned closer to the tunnel barrier layer than the soft magnetic layer.

It is furthermore preferable that the additional high polarization layer includes $Co_xFe_{1-x}(0 \leq x<1)$.

It is further preferable that the additional high polarization layer includes $Ni_xFe_{1-x}(0 \leq x \leq 0.35)$.

It is further preferable that the additional high polarization layer includes at least an intermetallic compound having a prefect spin polarization.

It is furthermore preferable that the intermetallic compound comprises semi-metals.

It is moreover preferable that the intermetallic compound comprises NiMnSb.

It is further preferable that the additional high polarization layer has a thickness of not more than 10 nanometers.

It is furthermore preferable that the additional high polarization layer has a thickness of not more than 5 nanometers.

It is further preferable that the additional soft magnetic layer includes a permalloy $Ni_xFe_{1-x}(0.35 \leq x \leq 0.8)$.

The fourth present invention provides a pinned layer in a ferromagnetic tunnel junction structure, wherein the pinned layer includes at least a high polarization layer and at least a soft magnetic layer so that the high polarization layer is positioned closer to the tunnel barrier layer than the soft magnetic layer.

The provision of the high polarization layer relatively close to or adjacent to or in contact with the tunnel barrier layer permits the novel ferromagnetic tunnel junction structure to exhibit a large magnetoresistance ratio. If, contrary to the present invention the high polarization layer were positioned far from the tunnel barrier layer, then the efficiency of increase in magnetoresistance ratio of the ferromagnetic tunnel function structure is remarkably reduced. In order to keep the high efficiency of increase in magnetoresistance ratio of the ferromagnetic tunnel function structure, it is, therefore, preferable that the high polarization layer is positioned relatively close to or adjacent to or in contact with the tunnel barrier layer. In the meantime, the high polarization layer has a coercive force which is high than a coercive force of the soft magnetic layer. If, contrary to the present invention, the pinned layer were designed to comprise only a single high polarization layer to obtain a possible increased magnetoresistance ratio, then the coercive force is too large to comply with the requirements. In accordance with the present invention, however, the soft magnetic layer is provided so that the high polarization layer is closer to the tunnel barrier layer than the soft magnetic layer. The prevision of the soft magnetic layer keeps a small coercive force or prevents any large increase in coercive force. For the above reasons, the multilayer structure provides a large polarization or a large magnetoresistance ratio and a small coercive force.

It is also preferable that the high polarization layer includes $Co_xFe_{1-x}(0 \leq x < 1)$.

It is also preferable that the high polarization layer includes $Ni_xFe_{1-x}(0 \leq x \leq 0.35)$.

It is also preferable that the high polarization layer includes at least an intermetallic compound having a prefect spin polarization.

It is further preferable that the intermetallic compound comprises semi-metals.

It is furthermore preferable that the intermetallic compound comprises NiMnSb.

It is also preferable that the high polarization layer has a thickness of not more than 10 nanometers.

It is further preferable that the high polarization layer has a thickness of not more than 5 nanometers.

It is also preferable that the soft magnetic layer includes a permalloy $Ni_xFe_{1-x}(0.35 \leq x \leq 0.8)$.

It is also preferable that the high polarization layer has a magnetic moment which is higher than a magnetic moment of cobalt.

The fifth present invention provides a ferromagnetic tunnel junction structure comprising: an anti-ferromagnetic layer; a first ferromagnetic layer in contact with said anti-ferromagnetic layer; a tunnel barrier layer in contact with said first ferromagnetic layer; and a second ferromagnetic layer in contact with said tunnel barrier layer so that said tunnel barrier layer is sandwiched between said first and second ferromagnetic layer, wherein said tunnel barrier layer comprises an alumina layer which has a thickness in the range of 0.4 nanometers to 2.0 nanometers and a barrier height in the range of 0.4 eV to 5.0 eV.

The tunnel barrier layer comprises an insulator which may be made of an insulator having a smaller surface free energy than a ferromagnetic material of the first ferromagnetic layer, for example, may be made of $Al_2O_3$. The tunnel barrier layer has a thickness in the range of 0.4 nanometers to 2.0 nanometers and also has a barrier height in the range of 0.4 eV to 5.0 eV. If, for example, the above ferromagnetic tunnel junction structure is applied to the transducer for converting electric variation into magnetic variation such as the magnetic head, then a resistance of the tunnel barrier layer is very important for characteristics of the transducer or the magnetic head. This resistance of the tunnel barrier layer depends upon both the thickness and the barrier height. It is preferable for application to the magnetic head that the thickness and the barrier height of the tunnel barrier layer are selected in the thickness range of 0.4 nanometers to 2.0 nanometers and the barrier height range of 0.4 eV to 5.0 eV, so that the resistance of the tunnel barrier layer is not higher than $1 \times 10^{-6} \Omega cm^2$. The alumina $Al_2O_3$ is preferably formed by a natural oxidation or a spontaneous oxidation of an aluminum film under a substrative thermal equilibrium state. The use of the alumina $Al_2O_3$ formed by the natural oxidation results in a large reduction in density of pin holes, thereby obtaining a high quality ferromagnetic tunnel junction. If the thickness of the aluminum layer is so thick, then a complete oxidation to the aluminum layer is difficult, whereby an unoxidized aluminum layer may remain. This unoxidized aluminum layer causes a spin scattering phenomenon. If, however, the thickness of the aluminum layer is so thin, a surface region of a base ferromagnetic layer such as a pinned layer or a free layer may be oxidized, resulting in a large drop in the magnetoresistance ratio of the ferromagnetic tunnel junction device. A surface irregularity of the base ferromagnetic layer is one of the important factor to decide an optimum thickness of the aluminum layer.

It is preferable that said second ferromagnetic layer includes at least a high polarization layer and at least a soft magnetic layer so that said high polarization layer is positioned closer to said tunnel barrier layer than said soft magnetic layer.

It is also preferable that said high polarization layer includes $Co_xFe_{1-x}(0 \leq x < 1)$.

It is also preferable that said high polarization layer includes $Ni_xFe_{1-x}(0 \leq x \leq 0.35)$.

It is also preferable that said high polarization layer includes at least an intermetallic compound having a prefect spin polarization.

It is further preferable that said intermetallic compound comprises semi-metals.

It is furthermore preferable that said intermetallic compound comprises NiMnSb.

It is also preferable that said high polarization layer has a thickness of not more than 10 nanometers.

It is further preferable that said high polarization layer has a thickness of not more than 5 nanometers.

it is also preferable that said high polarization layer has a magnetic moment which is higher than a magnetic moment of cobalt.

It is also preferable that said soft magnetic layer includes a permalloy $Ni_xFe_{1-x}(0.35 \leq x \leq 0.8)$.

The sixth present invention provides a method of forming a tunnel barrier layer on a ferromagnetic layer in a ferromagnetic tunnel junction structure, the method comprising the steps of: introducing an impurity-free oxygen-containing gas into a vacuum; and exposing a conductive layer on the ferromagnetic layer to the impurity-free oxygen-containing gas to cause a spontaneous oxidation of the conductive layer in a substantive thermal equilibrium state, thereby forming a tunnel barrier layer on the ferromagnetic layer.

It is also preferable that a pure oxygen gas is introduced into the vacuum.

The above first and second present inventions will be described in more concretely with reference to FIG. 3 which is a fragmentary cross sectional elevation view illustrative of a novel ferromagnetic tunnel junction multilayer structure in accordance with the first and second present inventions.

Figure 3:
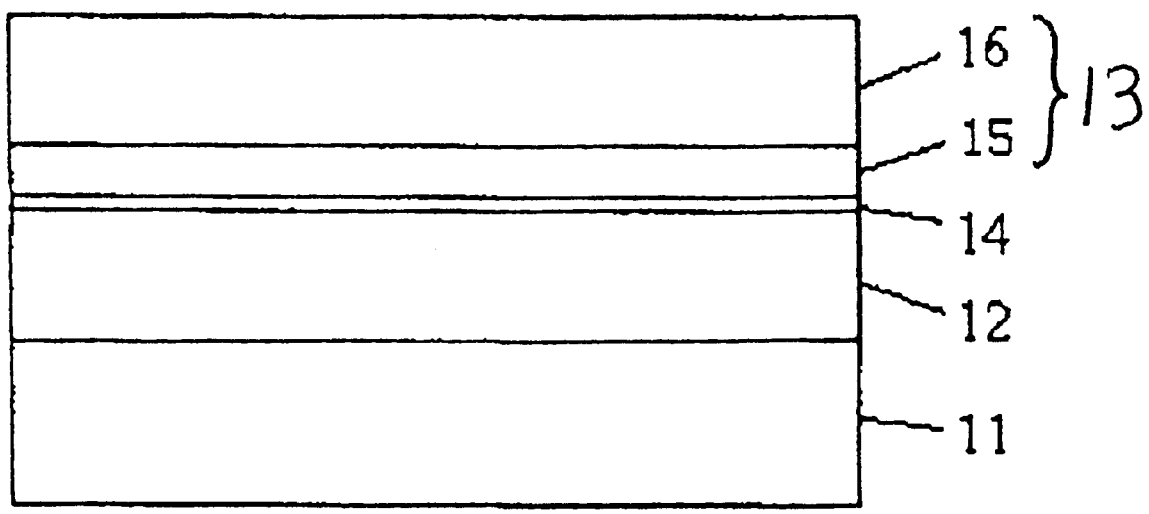
FIG. 3 is a fragmentary cross sectional elevation view illustrative of a novel ferromagnetic tunnel junction multilayer structure in accordance with the first and second present inventions.

With reference to FIG. 3, the novel ferromagnetic tunnel junction multilayer structure has the multilayer structure. A first ferromagnetic layer 12 is provided directly on and in contact with an anti-ferromagnetic layer 11. A tunnel barrier layer 14 is further provided directly on and in contact with the first ferromagnetic layer 13. A second ferromagnetic layer 13 is provided directly on and in contact with the tunnel barrier layer 14. The first ferromagnetic layer 12 serves as a pinned layer, whilst the second ferromagnetic layer 13 serves as a free layer. The free layer further comprises laminations of a high polarization layer 15 and a soft magnetic layer 16. The high polarization layer 15 is in contact with the tunnel barrier layer 14, whilst the soft magnetic layer 16 is in contact with the high polarization layer 15 so that the soft magnetic layer 16 is separated by the high polarization layer 15 from the tunnel barrier layer 14.

The provision of the high polarization layer relatively close to or adjacent to or in contact with the tunnel barrier layer permits the novel ferromagnetic tunnel junction structure to exhibit a large magnetoresistance ratio. If, contrary to the present invention, the high polarization layer were positioned far from the tunnel barrier layer, then the efficiency of increase in magnetoresistance ratio of the ferromagnetic tunnel junction structure is remarkably reduced. In order to keep the high efficiency of increase in magnetoresistance ratio of the ferromagnetic tunnel junction structure, it is, therefore, preferable that the high polarization layer is positioned relatively close to or adjacent to or in contact with the tunnel barrier layer. In the meantime, the high polarization layer has a coercive force which is high than a coercive force of the soft magnetic layer. If, contrary to the present invention, the free layer were designed to comprise only a single high polarization layer to obtain a possible increased magnetoresistance ratio, then the coercive force is too large to comply with the requirements. In accordance with the present invention, however, the soft magnetic layer is provided so that the high polarization layer is closer to the tunnel barrier layer than the soft magnetic layer. The prevision of the soft magnetic layer keeps a small coercive force or prevents any large increase in coercive force. For the above reasons, the multilayer structure provides a large polarization or a large magnetoresistance ratio and a small coercive force.

The first ferromagnetic layer may comprise a single high polarization layer or the same multilayer structure as the free layer.

The high polarization layer may be made of $Co_xFe_{1-x}$ ($0 \leq x < 1$), $Ni_xFe_{1-x}$ ($0 \leq x \leq 0.35$), or an intermetallic compound having a prefect spin polarization to obtain almost 100% polarization, thereby obtaining a large magnetoresistance ratio. The above intermetallic compound of the high polarization layer may comprise semi-metals such as NiMnSb.

If the high polarization layer has a thickness of not more than 10 nanometers, then the coercive force of the free layer almost depends upon the properties or the coercive force of the magnetic soft layer, for which reason it is preferable that the thickness of the high polarization layer is not more than 10 nanometers. It is more effective the high polarization layer has a thickness of not more than 5 nanometers.

If the soft magnetic layer is made of a permalloy $Ni_xFe_{1-x}$ ($0.35 \leq x \leq 0.8$), then a small coercive force of not higher than 1 Oe can be obtained.

It is also preferable that the high polarization layer has a magnetic moment, for example, which is higher than a magnetic moment of cobalt, in order to high efficiency of increase in the magnetoresistance ratio.

The tunnel barrier layer comprises an insulator which may be made of an insulator having a smaller surface free energy than a ferromagnetic material of the first ferromagnetic layer, for example, may be made of $Al_2O_3$. The tunnel barrier layer has a thickness in the range of 0.4 nanometers to 2.0 nanometers and also has a barrier height in the range of 0.4 eV to 5.0 eV. If, for example, the above ferromagnetic tunnel junction structure is applied to the transducer for converting electric variation into magnetic variation such as the magnetic head, then a resistance of the tunnel barrier layer is very important for characteristics of the transducer or the magnetic head. This resistance of the tunnel barrier layer depends upon both the thickness and the barrier height. It is preferably for application to the magnetic head that the thickness and the barrier height of the tunnel barrier layer are selected in the thickness range of 0.4 nanometers to 2.0 nanometers and the barrier height range of 0.4 eV to 5.0 eV, so that the resistance of the tunnel barrier layer is not higher than $1 \times 10^{-6}$ $\Omega cm^2$. The alumina $Al_2O_3$ is preferably formed by a natural oxidation or a spontaneous oxidation of an aluminum film under a substantive thermal equilibrium state. The use of the alumina $Al_2O_3$ formed by the natural oxidation results in a large reduction in density of pin holes, thereby obtaining a high quality ferromagnetic tunnel junction. If the thickness of the aluminum layer is so thick, then a complete oxidation to the aluminum layer is difficult, whereby an unoxidized aluminum layer may remain. This unoxidized aluminum layer causes a pin scattering phenomenon. If, however, the thickness of the aluminum layer is so thin, a surface region of a base ferromagnetic layer such as a pinned layer or a free layer may be oxidized, resulting in a large drop in the magnetoresistance ratio of the ferromagnetic tunnel junction device. A surface irregularity of the base ferromagnetic layer is one of the important factor to decide an optimum thickness of the aluminum layer.

The sixth present invention will be described in more concretely with reference to FIGS. 4A through 4C which are fragmentary cross sectional elevation views illustrative of a novel method of forming a novel ferromagnetic tunnel junction multilayer structure in accordance with the first and second present inventions.

Figure 4A:
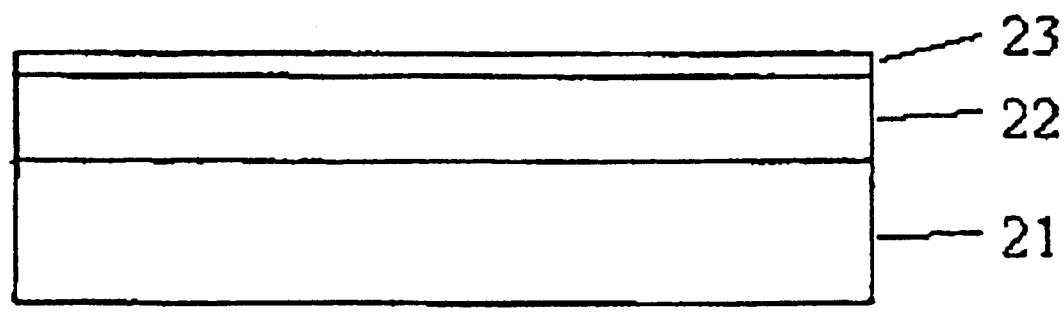
FIGS. 4A through 4C are fragmentary cross sectional elevation views illustrative of a novel method of forming a novel ferromagnetic tunnel junction multilayer structure in accordance with the first and second present inventions.

With reference to FIG. 4A, an anti-ferromagnetic layer 21, a first ferromagnetic layer 22 serving as a pinned layer, and a conductive layer 23 are sequentially grown in a vacuum.

Figure 4B:
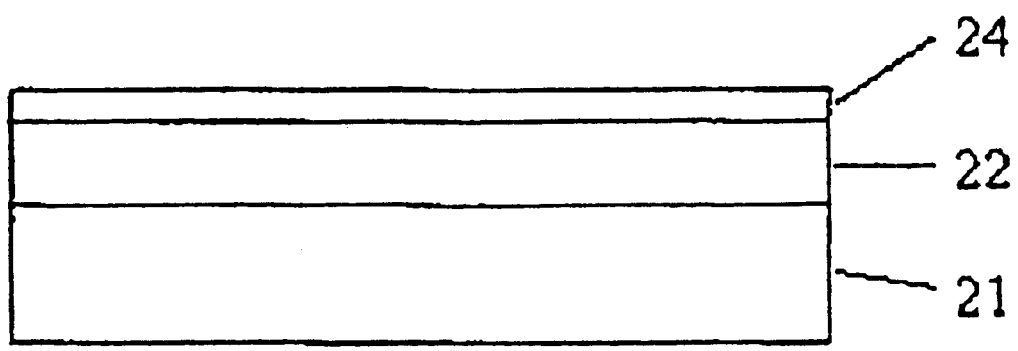

With reference to FIG. 4B, a pure oxygen is introduced into the above vacuum to form a pure oxygen gas. A surface of the conductive layer 23 is exposed to the pure oxygen gas to cause a natural oxidation or a spontaneous oxidation in a substantive thermal equilibrium state until almost entire parts of the conductive layer is oxidized without oxidation to a surface region of the first ferromagnetic layer 22 serving as the pinned layer, whereby an oxide tunnel barrier layer 24 is formed directly on and in contact with the first ferromagnetic layer 22 serving as the pinned layer.

Figure 4C:
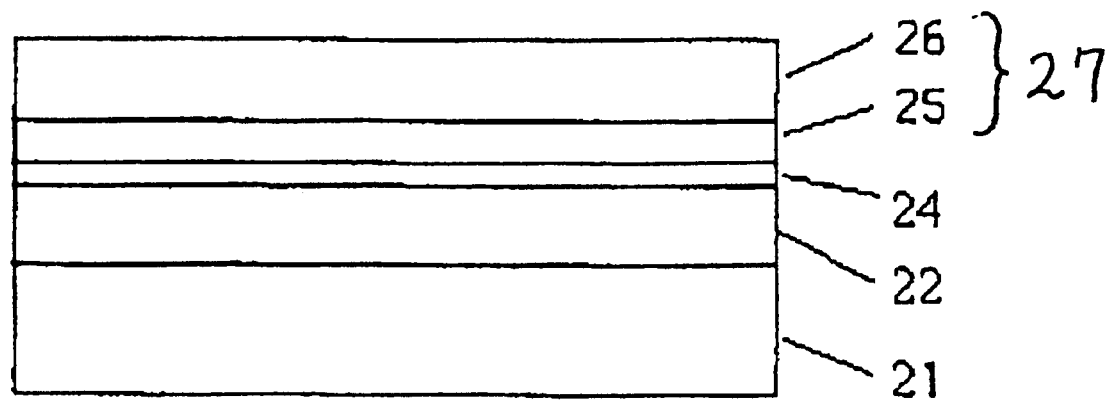

With reference to FIG. 4C, the used oxide gas is discharged before a high polarization layer 25 is grown on the tunnel barrier layer 24. A soft magnetic layer 26 is further grown on the high polarization layer 25, whereby laminations of the high polarization layer 25 and the soft magnetic layer 26 form a second ferromagnetic layer which serves as a free layer 27, thereby forming the above described novel ferromagnetic tunnel junction structure.

If the base ferromagnetic layer is made of Fe, Co, Ni or alloys including the same, then the conductive layer 23 may comprise an aluminum layer which has a smaller surface free energy than the ferromagnetic layer, so that the conductive layer 23 has a good step coverage to the base ferromagnetic layer. This good step coverage is important to form a pin hole free tunnel barrier layer which prevents any electric short circuit between the first and second ferromagnetic layers sandwiching the tunnel barrier layer.

Since a formation free energy of a single aluminum atoms is larger than formation free energies of Fe, Co, and Ni, the aluminum as the tunnel barrier layer is thermally stable on a junction interface between the base ferromagnetic layer and the tunnel barrier layer.

The above descriptions are of course applicable to when the tunnel barrier layer is formed on the free layer.

PREFERRED EMBODIMENTS

First Embodiment:

A first embodiment according to the present invention will be described in detail with reference to FIG. 5 which is a fragmentary cross sectional elevation view illustrative of a novel ferromagnetic tunnel junction multilayer structure formed on a substrate for a magnetoresistive element.

A silicon substrate 31 has a surface which is thermally oxidized. A buffer layer 32 is formed on the surface of the silicon substrate 31. The buffer layer 32 comprises laminations of a Ta layer and a $Ni_{0.81}Fe_{0.19}$ layer. The Ta layer is provided directly on and in contact with the surface of the silicon substrate 31. The $Ni_{0.81}Fe_{0.19}$ layer is laminated on the Ta layer. The Ta layer has a thickness of 5 nanometers. The $Ni_{0.81}Fe_{0.19}$ layer also has a thickness of 5 nanometers. An anti-ferromagnetic layer 33 made of FeMn is provided directly on and in contact with the buffer layer 32. The anti-ferromagnetic layer 33 has a thickness of 15 nanometers. A first ferromagnetic layer 34 serving as a pinned layer made of $Ni_{0.81}Fe_{0.19}$ is provided directly on and in contact with the anti-ferromagnetic layer 33. The first ferromagnetic layer 34 has a thickness of 10 nanometers. A tunnel barrier layer 35 made of $Al_2O_3$ is provided directly on and in contact with the first ferromagnetic layer 34. The tunnel barrier layer 35 has a thickness in the range of 0.4–2.0 nanometers. A second ferromagnetic layer 38 serving as a free layer is formed on the tunnel barrier layer 35. The second ferromagnetic layer 38 comprises a high polarization layer 36 made of CoFe and a soft magnetic layer 37 made of $Ni_{0.81}Fe_{0.19}$. The high polarization layer 36 is provided directly on and in contact with the tunnel barrier layer 35. The soft magnetic layer 37 is laminated on the high polarization layer 36. The high polarization layer 36 has a thickness of 3 nanometers. The soft magnetic layer 37 has a thickness of 15 nanometers.

The buffer layer 32 is provided for subsequent growth of anti-ferromagnetic FeMn having a face-centered cubit structure in gamma-phase In order o obtain this face-centered cubit structure, the $Ni_{0.81}Fe_{0.19}$ layer in the buffer layer is (111)-oriented. The Ta layer is a seed layer for growing the (111)-oriented $Ni_{0.81}Fe_{0.19}$ layer. The Ta layer may be replaced by other layers such as a Nb layer, a Ti layer, a Hf layer and a Zr layer for permitting growth of the (111)-oriented $Ni_{0.81}Fe_{0.19}$ layer.

The above FeMn anti-ferromagnetic layer may be replaced by other anti-ferromagnetic layers such as an IrMn anti-ferromagnetic layer, a NiMn anti-ferromagnetic layer, a PtMn anti-ferromagnetic layer, and a PdMn anti-ferromagnetic layer. Magnetization directions of the first ferromagnetic layer serving as the pinned layer and the second ferromagnetic layer serving as the free layer are perpendicular to each other.

Figure 5:
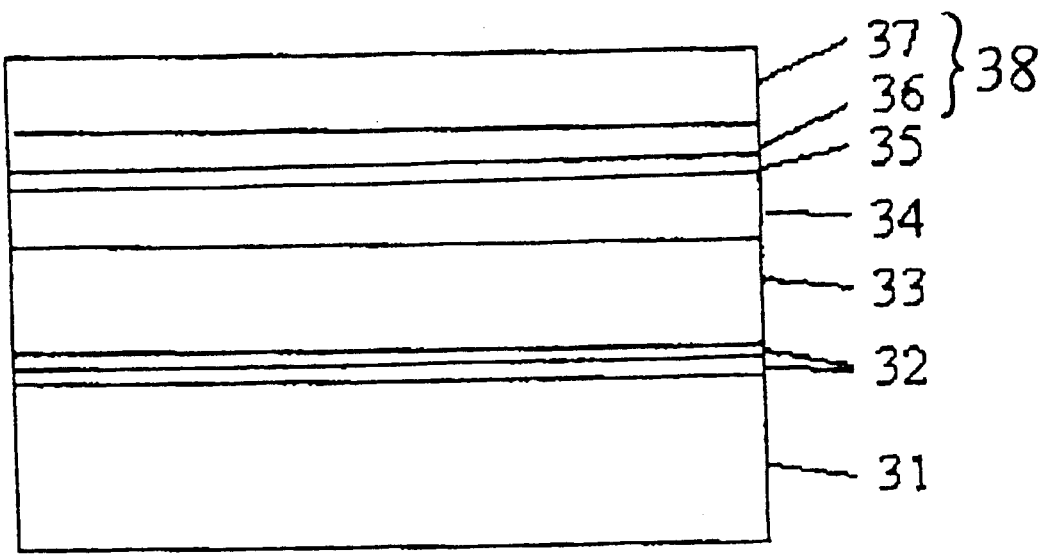
FIG. 5 is a fragmentary cross sectional elevation view illustrative of a novel ferromagnetic tunnel junction multilayer structure formed on a substrate for a magnetoresistive element in a first embodiment in accordance with the present invention.

FIGS. 6A through 6G are fragmentary cross-sectional elevation views illustrative of a novel method of forming a magnetoresistive element having the above novel ferromagnetic tunnel junction multilayer structure of FIG. 5.

Figure 6A:
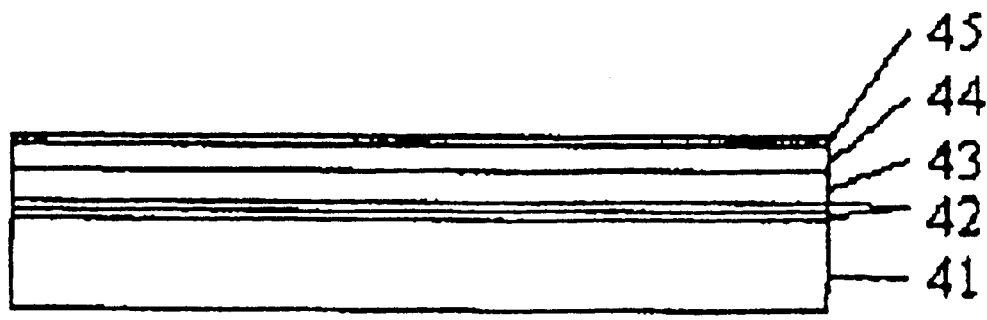
FIGS. 6A through 6G are fragmentary cross sectional elevation views illustrative of a novel method of forming a magnetoresistive element having the above novel ferromagnetic tunnel junction multilayer structure of FIG. 5.

With reference to FIG. 6A, a surface of a silicon substrate 41 is thermally oxidized. A buffer layer 42 comprising laminations of a Ta layer and a $Ni_{0.81}Fe_{0.19}$ layer is deposited by a sputtering process on the surface of the silicon substrate 41. Subsequently, an anti-ferromagnetic layer 43 made of FeMn is then deposited by the sequential sputtering process on the buffer layer 42. Subsequently, a first ferromagnetic layer 44 serving as a pinned layer made of $Ni_{0.81}Fe_{0.19}$ is then deposited by the sequential sputtering process on the anti-ferromagnetic layer 43. Subsequently, an aluminum layer 45 having a thickness of 2 nanometers is then deposited by the sequential sputtering process on the first ferromagnetic layer 44. The above sequential sputtering process were carried out by use of a high frequency magnetron sputtering system provided with five targets of 4 inches under sputtering conditions of a background pressure of not higher than $1 \times 10^{-7}$ Torr, an Ar pressure of about 10 mTorr, and a high frequency power of about 200 W.

Figure 6B:
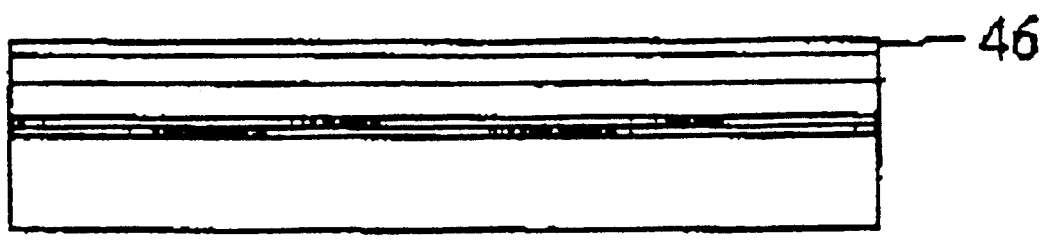

With reference to FIG. 6B, a pure oxygen is introduced into the sputtering chamber before an oxygen pressure is maintained at 20 Torr for 10 minutes to cause a natural oxidation of the aluminum layer 45, thereby forming a tunnel barrier layer 46 made of $Al_2O_3$ on the first ferromagnetic layer 44.

Figure 6C:
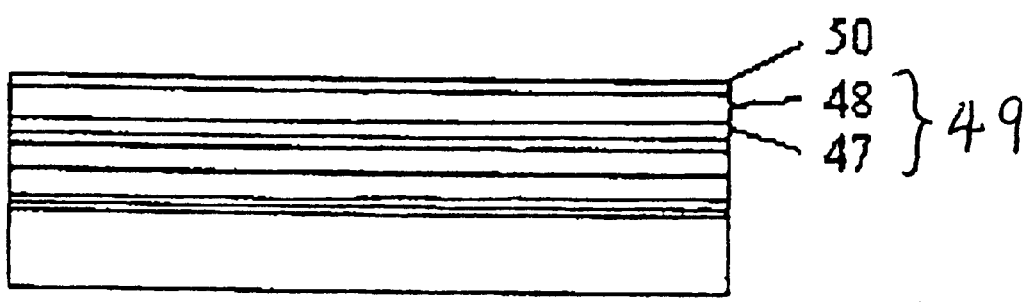

With reference to FIG. 6C, the oxygen gas is discharged to drop the pressure to the background pressure. A high polarization layer 47 made of CoFe and a soft magnetic layer 48 made of $Ni_{0.81}Fe_{0.19}$ and a Ta passivation layer 50 having a thickness of 5 nanometers are sequentially deposited by the sputtering process, thereby forming the novel ferromagnetic tunnel junction multilayer structure. The passivation layer 50 is to protect the novel ferromagnetic tunnel junction multilayer structure from contamination in the later fabrication processes. During the above sputtering deposition processes, a first magnetic field of 100 Oe is continued to be applied in parallel to the surface of the substrate 41. After the above sputtering deposition processes, a second magnetic field of 200 Oe is continued to be applied in vertical to the surface of the substrate 41 for carrying out a heat treatment for one hour.

Figure 6D:
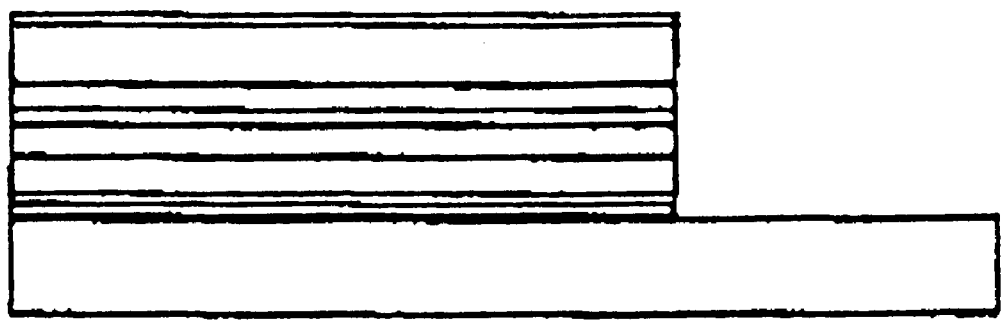

With reference to FIG. 6D, a photo-lithography technique and an ion-milling technique are used for patterning the above ferromagnetic tunnel junction multilayer structure in a form of a bottom interconnection shape so that a longitudinal direction of the pattern corresponds to the direction of the application of the first magnetic field.

Figure 6E:
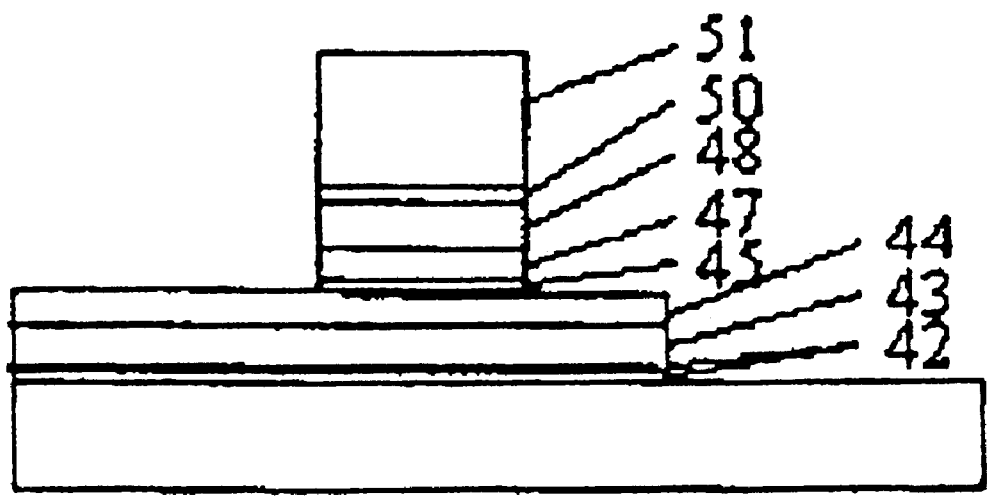

With reference to FIG. 6E, a resist pattern 51 is selectively formed on the passivation layer 50 for subsequent ion-milling process to selectively etch up to the tunnel barrier layer 46.

Figure 6F:
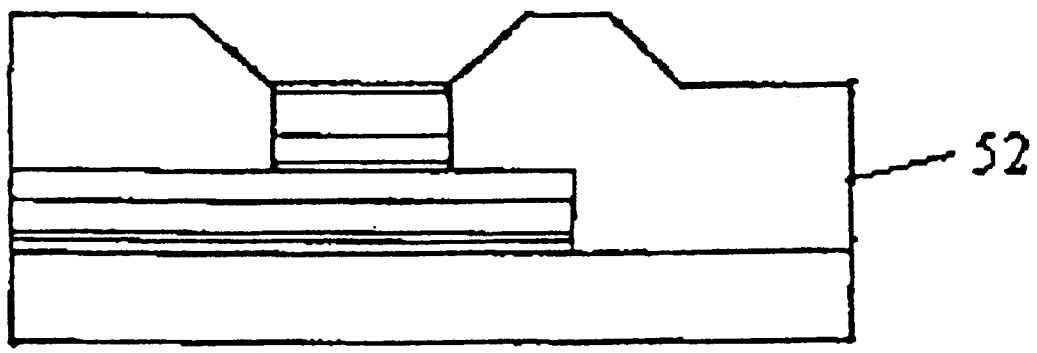

With reference to FIG. 6F, the resist pattern 51 remains for electron beam deposition of an alumina layer 52 having a thickness of 250 nanometers and subsequent lift-off process.

Figure 6G:
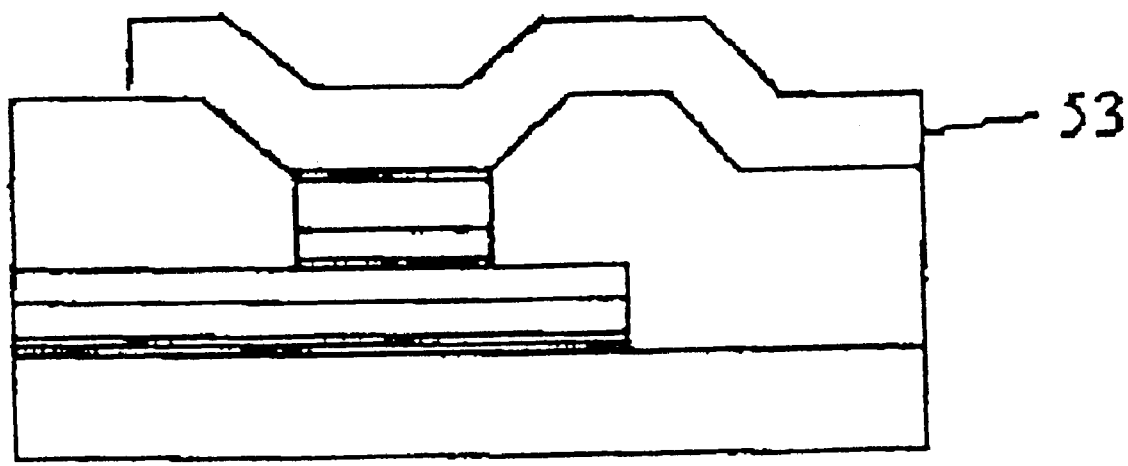

With reference to FIG. 6G, the resist pattern 51 is removed from the passivation layer 50 before the passivation layer 50 is subjected to a reverse-sputtering process for cleaning the exposed surface. Thereafter, an aluminum interconnection layer 53 having a thickness of 200 nanometers is deposited on an entire surface thereby to obtain an electrical contact between the aluminum interconnection layer 53 and the ferromagnetic tunnel junction multilayer structure. A resist pattern not illustrated is formed on the aluminum interconnection layer 53 for subsequent ion-milling process for patterning the aluminum interconnection layer 53 to form an aluminum interconnection 53. As a result, the magnetoresistive element having the novel ferromagnetic tunnel junction mutlilayer structure is completed.

Figure 7:
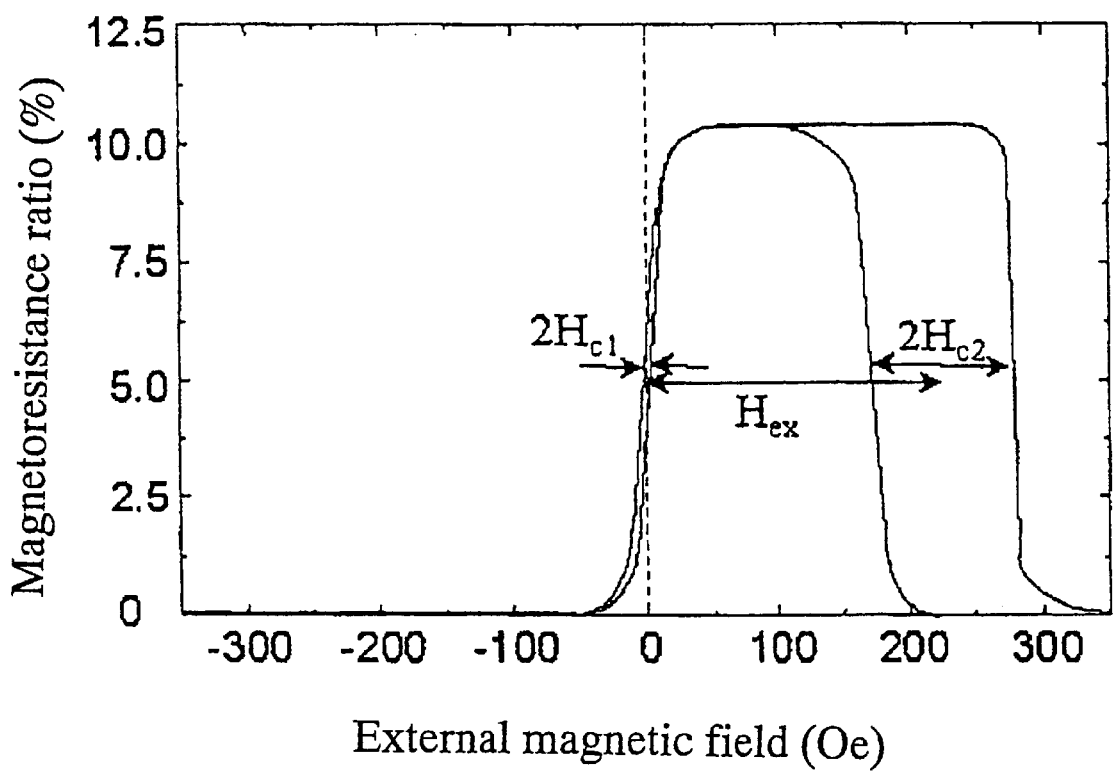
FIG. 7 is a diagram illustrative of a magnetoresistance ratio curve showing variations in magnetoresistance ratio of the above magnetoresistive element over external magnetic field in a first embodiment in accordance with the present invention.

FIG. 7 is a diagram illustrative of a magnetoresistance ratio curve showing variations in magnetoresistance ratio of the above magnetoresistive element over external magnetic field, wherein "Hex" represents an intensity of exchange-coupling magnetic field between he anti-ferromagnetic layer 44 and the first ferromagnetic layer 44 serving as the pinned layer, "Hc1" represents a coercive force of the second ferromagnetic layer 49 and "Hc2" represents a coercive force of the first ferromagnetic layer 44 serving as the pinned layer. The magnetoresistance ratio of the above magnetoresistive element having the improved ferromagnetic tunnel junction multilayer structure is 10.4%. On the other hand, the magnetoresistance ratio of a comparative magnetoresistive element free of the CoFe high polarization layer 47 is only 5.9%. The free layer 49 of the improved ferromagnetic tunnel junction multilayer structure has a coercive force of 1.6 Oe which is slightly higher than a coercive force of the comparative magnetoresistive element free of the CoFe high polarization layer 47 by no larger than 1 Oe. The above double layered structure of the free layer provides a high magnetoresistance ratio of the magnetoresistive element without substantive increase in coercive force of the free layer.

Figure 8:
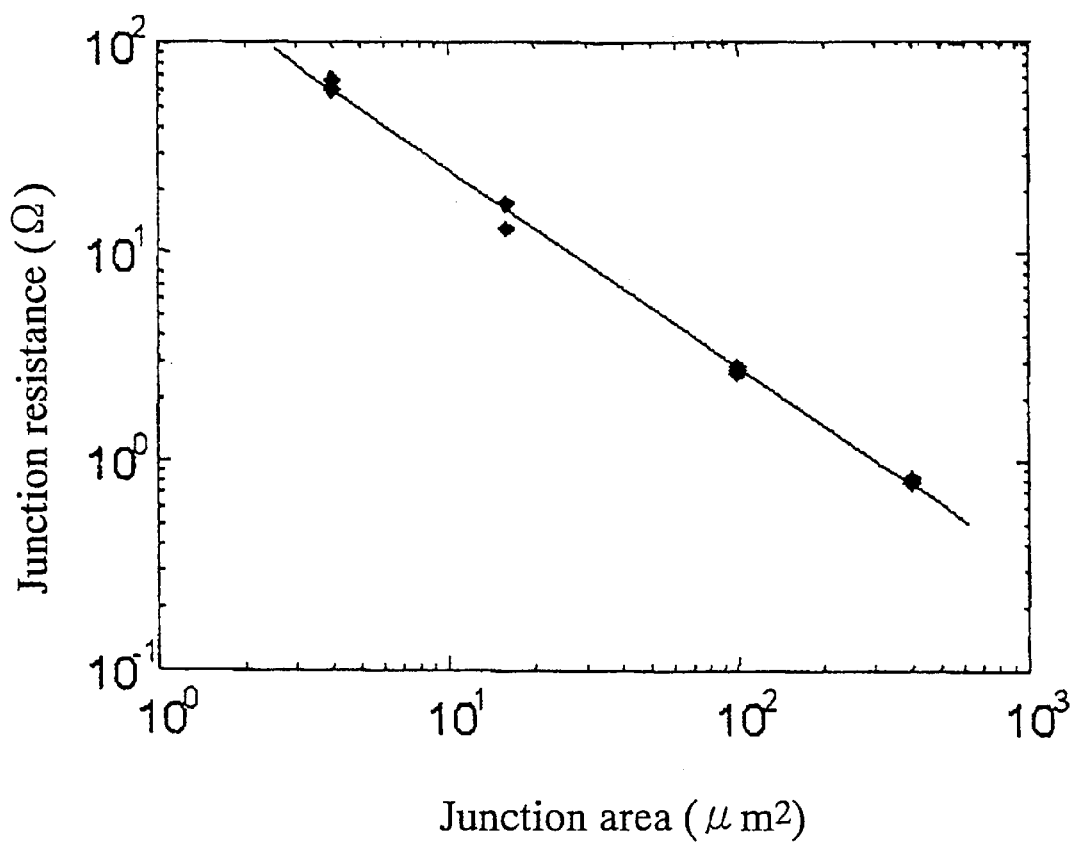
FIG. 8 is a diagram illustrative of variations in junction resistance over junction area of ferromagnetic tunnel junction of the ferromagnetic tunnel junction multilayer structure in a first embodiment in accordance with the present invention.

FIG. 8 is a diagram illustrative of variations in junction resistance over junction area of ferromagnetic tunnel junction of the ferromagnetic tunnel junction multilayer structure. The junction resistance is inversely proportional to the junction area. A resistance normalized with area can be calculated to be $2.4 \times 1.0^{-6}$ $\Omega cm^2$ from a gradient of the inversely proportional line. Such low resistance of the ferromagnetic tunnel junction permits various applications to devices such as magnetic head. The resistance of the ferromagnetic tunnel junction is controllable in a few digit range by controlling the oxygen pressure and a substrate temperature during the formations of the sputtering processes for forming the ferromagnetic tunnel junction multilayer structure. A maximum variation in junction resistance of the Si wafer of 2 inches is within ±4%.

Figure 9:
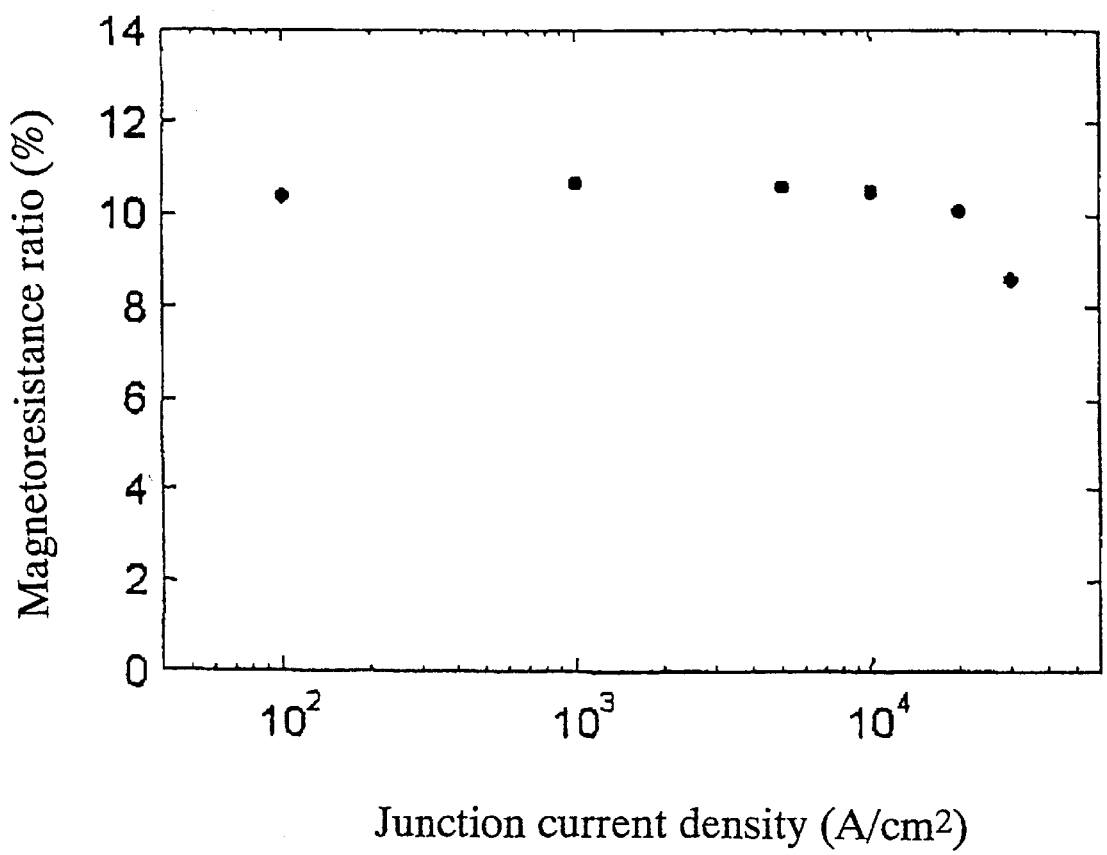
FIG. 9 is a diagram illustrative of variations in magnetoresistance ratio over junction current density of the above improved ferromagnetic tunnel junction multilayer structure in a first embodiment in accordance with the present invention.

FIG. 9 is a diagram illustrative of variations in magnetoresistance ratio over junction current density of the above improved ferromagnetic tunnel junction mutlilayer structure, wherein the junction area is $10 \times 10$ $\mu m^2$. As the junction current density is not higher than $1 \times 10^4$ $A/cm^2$, the magnetoresistance ratio remains unchanged at over 10%. As the junction current density is $3 \times 10^4$ $A/cm^2$, the magnetoresistance ratio is about 20% which is still high. A direct current signal output voltage of the above magnetoresistive element can be calculated to be 3 mV under the junction current density of $1 \times 10^4$ $A/cm^2$ and 7 mV under the junction current density of $3 \times 10^4$ $A/cm^2$.

Figure 10:
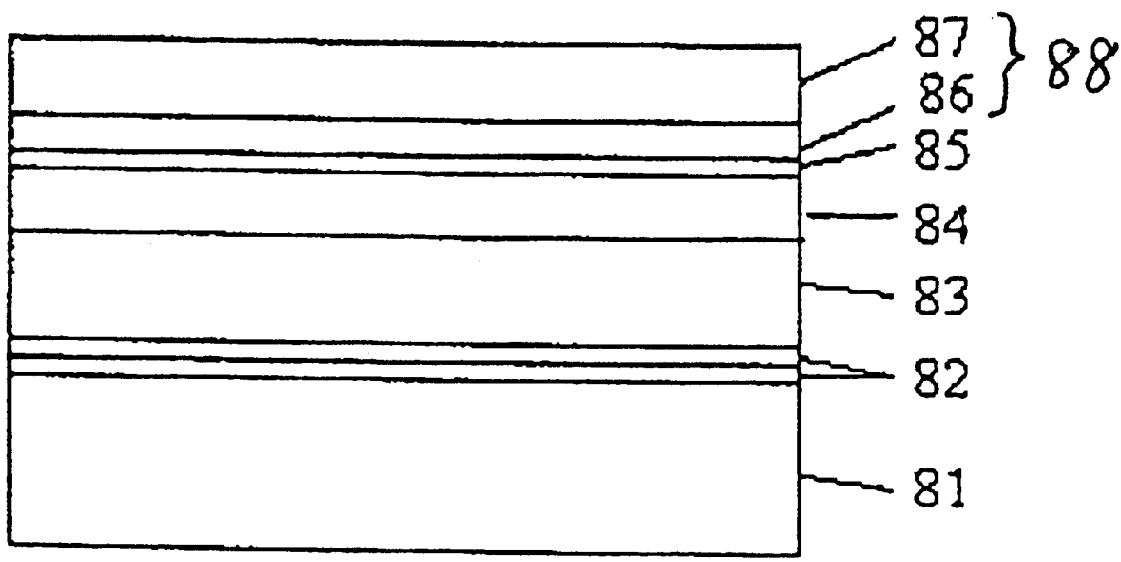
FIG. 10 is a fragmentary cross sectional elevation view illustrative of a novel ferromagnetic tunnel junction multilayer structure formed on a substrate for a magnetoresistive element in a second embodiment in accordance with the present invention.

Second Embodiment:

A second embodiment according to the present invention will be described in detail with reference to FIG. 10 which is a fragmentary cross sectional elevation view illustrative of a novel ferromagnetic tunnel junction multilayer structure formed on a substrate for a magnetoresistive element. A structural difference of the novel ferromagnetic tunnel junction multilayer structure of this embodiment from the above novel ferromagnetic tunnel junction mutlilayer structure of the first embodiment is only in that the first ferromagnetic layer serving as the pinned layer is made of CoFe.

A silicon substrate 81 has a surface which is thermally oxidized. A buffer layer 82 is formed on the surface of the silicon substrate 81. The buffer layer 82 comprises laminations of a Ta layer and a $Ni_{0.81}Fe_{0.19}$ layer. The Ta layer is provided directly on and in contact with the surface of the silicon substrate 81. The $Ni_{0.81}Fe_{0.19}$ layer is laminated on the Ta layer. The Ta layer has a thickness of 5 nanometers. The $Ni_{0.81}Fe_{0.19}$ layer also has a thickness of 5 nanometers. An anti-ferromagnetic layer 83 made of FeMn is provided directly on and in contact with the buffer layer 82. The anti-ferromagnetic layer 83 has a thickness of 15 nanometers. A first ferromagnetic layer 84 serving as a pinned layer made of CoFe is provided directly on and in contact with the anti-ferromagnetic layer 83. The first ferromagnetic layer 84 has a thickness of 10 nanometers. A tunnel barrier layer 85 made of $Al_2O_3$ is provided directly on and in contact with the first ferromagnetic layer 84. The tunnel barrier layer 85 has a thickness in the range of 0.4–2.0 nanometers. A second ferromagnetic layer 88 serving as a free layer is formed on the tunnel barrier layer 85. The second ferromagnetic layer 88 comprises a high polarization layer 86 made of CoFe and a soft magnetic layer 87 made of $Ni_{0.81}Fe_{0.19}$. The high polarization layer 86 is provided directly on and in contact with the tunnel barrier layer 85. The soft magnetic layer 87 is laminated on the high polarization layer 86. The high polarization layer 86 has a thickness of 3 nanometers. The soft magnetic layer 87 has a thickness of 15 nanometers.

The magnetoresistance ratio of the above magnetoresistive element having the improved ferromagnetic tunnel junction mutlilayer structure is 18.8%. The free layer of the improved ferromagnetic tunnel junction multilayer structure has a coercive force of 2.0 Oe. The above double layered structure of the free layer provides a high magnetoresistance ratio of the magnetoresistive element without substantive increase in coercive force of the free layer.

As the junction current density is not higher than $1 \times 10^4$ $A/cm^2$, the magnetoresistance ratio remains unchanged at over 18%.

Figure 11:
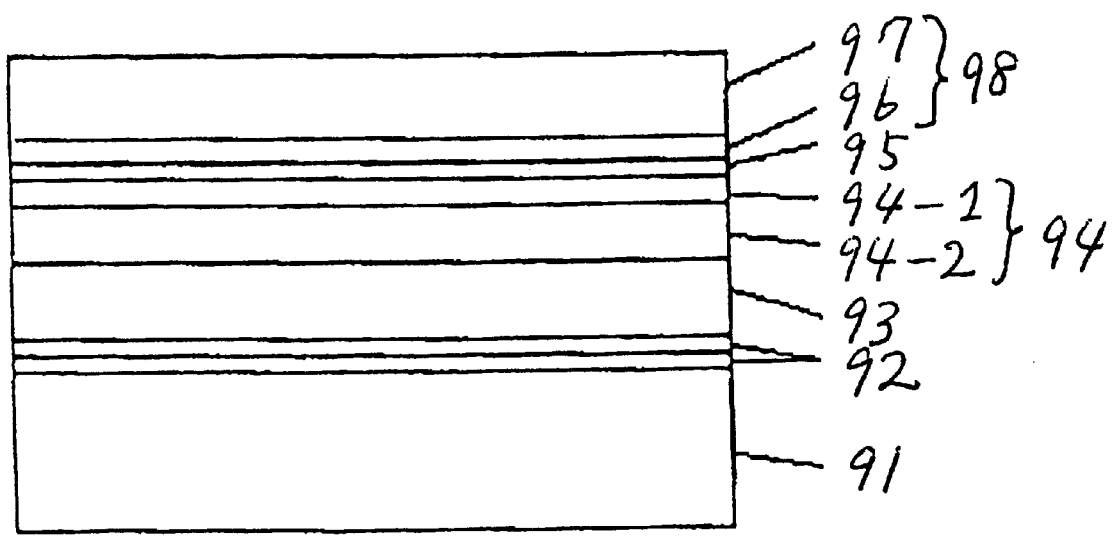
FIG. 11 is a fragmentary cross sectional elevation view illustrative of a novel ferromagnetic tunnel junction multilayer structure formed on a substrate for a magnetoresistive element in a third embodiment in accordance with the present invention.

Third Embodiment:

A third embodiment according to the present invention will be described in detail with reference to FIG. 11 which is a fragmentary cross sectional elevation view illustrative of a novel ferromagnetic tunnel junction multilayer structure formed on a substrate for a magnetoresistive element. A structural difference of the novel ferromagnetic tunnel junction multilayer structure of this embodiment from the above novel ferromagnetic tunnel junction multilayer structure of the first embodiment is only in that the first ferromagnetic layer serving as the pinned layer comprises laminations of a CoFe high polarization layer and a soft magnetic layer, wherein the CoFe high polarization layer is provided directly on and in contact with a bottom surface of a tunnel barrier layer and the CoFe high polarization layer is laminated on the soft magnetic layer.

A silicon substrate 91 has a surface which is thermally oxidized. A buffer layer 92 is formed on the surface of the silicon substrate 91. The buffer layer 92 comprises laminations of a Ta layer and a $Ni_{0.91}Fe_{0.19}$ layer. The Ta layer is provided directly on and in contact with the surface of the silicon substrate 91. The $Ni_{0.81}Fe_{0.19}$ layer is laminated on the Ta layer. The Ta layer has a thickness of 5 nanometers. The $Ni_{0.81}Fe_{0.19}$ layer also has a thickness of 5 nanometers. An anti-ferromagnetic layer 93 made of FeMn is provided directly on and in contact with the buffer layer 92. The anti-ferromagnetic layer 93 has a thickness of 15 nanometers. A first ferromagnetic layer 94 serving as a pinned layer is provided directly on and in contact with the anti-ferromagnetic layer 93. The first ferromagnetic layer 94 serving as the pinned layer comprises laminations of a CoFe high polarization layer 94-1 and a soft magnetic layer 94-2, wherein the soft magnetic layer 94-2 is provided directly on and in contact with the anti-ferromagnetic layer 93 and the CoFe high polarization layer 94-1 is laminated on the soft magnetic layer 94-2. The soft magnetic layer 94-2 is made of $Ni_{0.81}Fe_{0.19}$. The soft magnetic layer 94-2 has a thickness of 10 nanometers. The CoFe high polarization layer 94-1 has a thickness of 3 nanometers. A tunnel barrier layer 95 made of $Al_2O_3$ is provided directly on and in contact with the first ferromagnetic layer 94. The tunnel barrier layer 95 has a thickness in the range of 0.4–2.0 nanometers. A second ferromagnetic layer 98 serving as a free layer is formed on the tunnel barrier layer 95. The second ferromagnetic layer 98 comprises a high polarization layer 96 made of CoFe and a soft magnetic layer 97 made of $Ni_{0.81}Fe_{0.19}$. The high polarization layer 96 is provided directly on and in contact with the tunnel barrier layer 95. The soft magnetic layer 97 is laminated on the high polarization layer 96. The high polarization layer 96 has a thickness of 3 nanometers. The soft magnetic layer 97 has a thickness of 15 nanometers.

The magnetoresistance ratio of the above magnetoresistive element having the improved ferromagnetic tunnel junction multilayer structure is 17.5%. The free layer of the improved ferromagnetic tunnel junction multilayer structure has a coercive force of 1.8 Oe. The above doubled layered structure of the free layer provides a high magnetoresistance ratio of the magnetoresistive element without substantive increase in coercive force of the free layer.

As the junction current density is not higher than $1\times10^4$ $A/cm^2$, the magnetoresistance ratio remains unchanged at over 17%.

Figure 12:
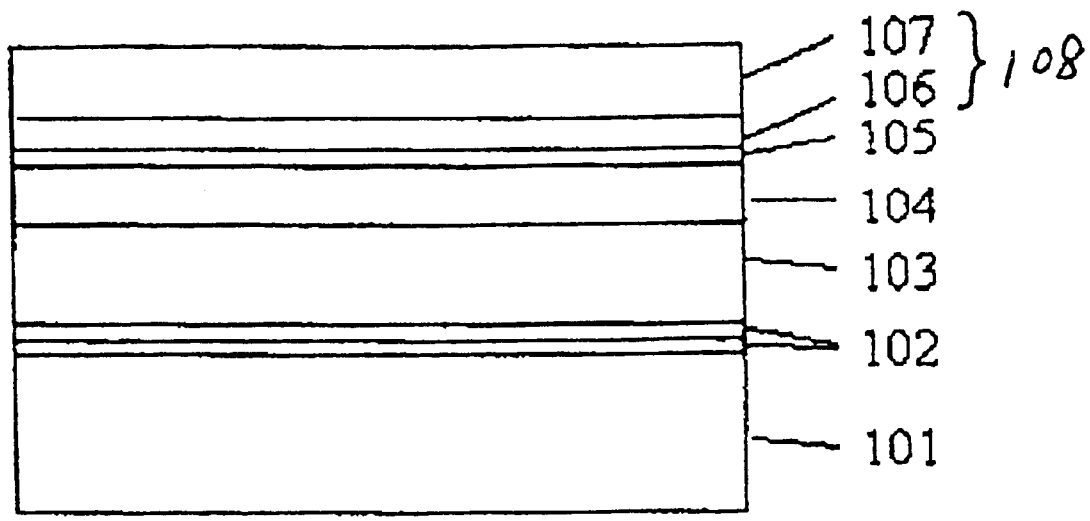
FIG. 12 is a fragmentary cross sectional elevation view illustrative of a novel ferromagnetic tunnel junction multilayer structure formed on a substrate for a magnetoresistive element in a fourth embodiment in accordance with the present invention.

Fourth Embodiment:

A fourth embodiment according to the present invention will be described in detail with reference to FIG. 12 which is a fragmentary cross sectional elevation view illustrative of a novel ferromagnetic tunnel junction mutlilayer structure formed on a substrate for a magnetoresistive element. A structural difference of the novel ferromagnetic tunnel junction multilayer structure of this embodiment from the above novel ferromagnetic tunnel junction mutlilayer structure of the first embodiment is only in that the high polarization layer in the second ferromagnetic layer serving as the free layer is made of Fe.

A silicon substrate 101 has a surface which is thermally oxidized. A buffer layer 102 is formed on the surface of the silicon substrate 101. The buffer layer 102 comprises laminations of a Ta layer and a $Ni_{0.81}Fe_{0.19}$ layer. The Ta layer is provided directly on and in contact with the surface of the silicon substrate 101. The $Ni_{0.81}Fe_{0.19}$ layer is laminated on the Ta layer. The Ta layer has a thickness of 5 nanometers. The $Ni_{0.81}Fe_{0.19}$ layer also has a thickness of 5 nanometers. An anti-ferromagnetic layer 103 made of FeMn is provided directly on and in contact with the buffer layer 102. The anti-ferromagnetic layer 103 has a thickness of 15 nanometers. A first ferromagnetic layer 104 serving as a pinned layer made of $Ni_{0.81}Fe_{0.19}$ is provided directly on and in contact wit the anti-ferromagnetic layer 103. The first ferromagnetic layer 104 has a thickness of 10 nanometers. A tunnel barrier layer 105 made of $Al_2O_3$ is provided directly on and in contact with the first ferromagnetic layer 104. The tunnel barrier layer 105 has a thickness in the range of 0.4–2.0 nanometers. A second ferromagnetic layer 108 serving as a free layer is formed on the tunnel barrier layer 105. The second ferromagnetic layer 108 comprises a high polarization layer 106 made of FE and a soft magnetic layer 107 made of $Ni_{0.81}Fe_{0.19}$. The high polarization layer 106 is provided directly on and in contact with the tunnel barrier layer 105. The soft magnetic layer 107 is laminated on the high polarization layer 106. The high polarization layer 106 has a thickness of 3 nanometers. The soft magnetic layer 107 has a thickness of 15 nanometers.

The magnetoresistance ratio of the above magnetoresistive element having the improved ferromagnetic tunnel junction multilayer structure is 10.0%. The free layer of the improved ferromagnetic tunnel junction multilayer structure has a coercive force of 1.2 Oe. The above double layered structure of the free layer provides a high magnetoresistance ratio of the magnetoresistive element without substantive increase in coercive force of the free layer.

As the junction current density is not higher than $1\times10^4$ $A/cm^2$, the magnetoresistance ratio remains unchanged at over 10%.

As a modification to the fourth embodiment, the first ferromagnetic layer serving as the pinned layer may be made of Fe.

As a modification to the fourth embodiment, the first ferromagnetic layer serving as the pinned layer may comprise laminations of a Fe high polarization layer and a soft magnetic layer, wherein the Fe high polarization layer is provided directly on and in contact with a bottom surface of a tunnel barrier layer and the Fe high polarization layer is laminated on the soft magnetic layer.

Figure 13:
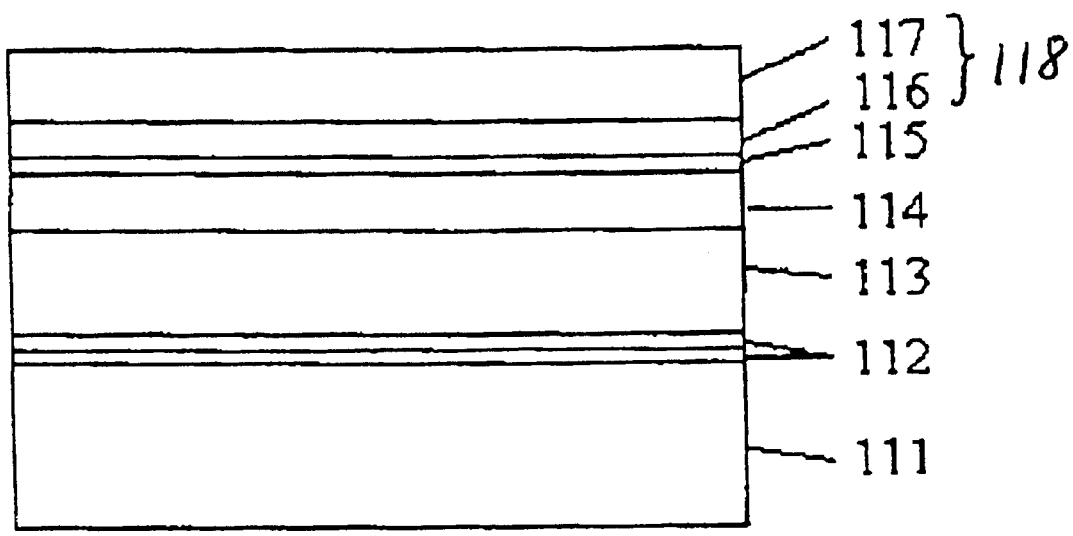
FIG. 13 is a fragmentary cross sectional elevation view illustrative of a novel ferromagnetic tunnel junction multilayer structure formed on a substrate for a magnetoresistive element in a fifth embodiment in accordance with the present invention.

Fifth Embodiment:

A fifth embodiment according to the present invention will be described in detail with reference to FIG. 13 which is fragmentary cross sectional elevation view illustrative of a novel ferromagnetic tunnel junction mutlilayer structure formed on a substrate for a magnetoresistive element. A structural difference of the novel ferromagnetic tunnel junction multilayer structure of this embodiment from the above novel ferromagnetic tunnel junction mutilayer structure of the first embodiment is only in that the first ferromagnetic layer serving as the pinned layer is made of NiMnSb, and also that the high polarization layer in the second ferromagnetic layer serving as the free layer is made of NiMnSb.

A silicon substrate 111 has a surface which is thermally oxidized. A buffer layer 112 is formed on the surface of the silicon substrate 111. The buffer layer 112 comprises laminations of a Ta layer and a $Ni_{0.81}Fe_{0.19}$ layer. The Ta layer is provided directly on and in contact with the surface of the silicon substrate 111. The $Ni_{0.81}Fe_{0.19}$ layer is laminated on the Ta layer. The Ta layer has a thickness of 5 nanometers. The $Ni_{0.81}Fe_{0.19}$ layer also has a thickness of 5 nanometers. An anti-ferromagnetic layer 113 made of FeMn is provided directly on and in contact with the buffer layer 112. The anti-ferromagnetic layer 113 has a thickness of 15 nanometers. A first ferromagnetic layer 114 serving as a pinned layer made of NiMnSb is provided directly on and in contact with the anti-ferromagnetic layer 113. The first ferromagnetic layer 114 has a thickness of 10 nanometers. A tunnel barrier layer 115 made of $Al_2O_3$ is provided directly on and in contact with the first ferromagnetic layer 114. The tunnel barrier layer 115 has a thickness in the range of 0.4–2.0 nanometers. A second ferromagnetic layer 118 serving as a free layer is formed on the tunnel barrier layer 115. The second ferromagnetic layer 118 comprises a high polarization layer 116 made of NiMnSb and a soft magnetic layer 117 made of $Ni_{0.81}Fe_{0.19}$. The high polarization layer 116 is provided directly on and in contact with the tunnel barrier layer 115. The soft magnetic layer 117 is laminated on the high polarization layer 116. The high polarization layer 116 has a thickness of 3 nanometers. The soft magnetic layer 117 has a thickness of 15 nanometers.

The magnetoresistance ratio of the above magnetoresistive element having the improved ferromagnetic tunnel junction multilayer structure is 21.3%. The free layer of the improved ferromagnetic tunnel junction multilayer structure has a coercive force of 2.6 Oe. The above double layered structure of the free layer provides a high magnetoresistance ratio of the magnetoresistive element without substantive increase in coercive force of the free layer.

As the junction current density is not higher than $1 \times 10^4$ $A/cm^2$, the magnetoresistance ratio remains unchanged at over 21%.

As a modification to the fourth embodiment, the first ferromagnetic layer serving as the pinned layer may be made of $Ni_{0.81}Fe_{0.19}$.

As a modification to the fourth embodiment, the first ferromagnetic layer serving as the pinned layer may comprise laminations of a NiMnSb high polarization layer and a soft magnetic layer of $Ni_{0.81}Fe_{0.19}$, wherein the NiMnSb high polarization layer is provided directly on and in contact with a bottom surface of a tunnel barrier layer and the NiMnSb high polarization layer is laminated on the $Ni_{0.81}Fe_{0.19}$ soft magnetic layer.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A ferromagnetic tunnel junction structure comprising:
    an anti-ferromagnetic layer;
    a first ferromagnetic layer in contact with said anti-ferromagnetic layer;
    a tunnel barrier layer in contact with said first ferromagnetic layer;
    a second ferromagnetic layer in contact with said tunnel barrier layer so that said tunnel barrier layer is sandwiched between said first and second ferromagnetic layer,
    wherein said second ferromagnetic layer includes at least a high polarization layer of a first NiFe material and at least a soft magnetic layer of a second NiFe material so that said high polarization layer is positioned closer to said tunnel barrier layer than said soft magnetic layer.

2. The ferromagnetic tunnel junction structure as claimed in claim 1, wherein said high polarization layer includes at least an intermetallic compound having a prefect spin polarization.

3. The ferromagnetic tunnel junction structure as claimed in claim 2, wherein said intermetallic compound comprises semi-metals.

4. The ferromagnetic tunnel junction structure as claimed in claim 1, wherein said high polarization layer has a thickness of not more than 10 nanometers.

5. The ferromagnetic tunnel junction structure as claimed in claim 4, wherein said high polarization layer has a thickness of not more than 5 nanometers.

6. The ferromagnetic tunnel junction structure as claimed in claim 1, wherein said high polarization layer has a magnetic moment which is higher than a magnetic moment of cobalt.

7. The ferromagnetic tunnel junction structure as claimed in claim 1, wherein said tunnel barrier layer is made of an oxide of a conductor having a smaller surface free energy than a ferromagnetic material of said first ferromagnetic layer.

8. The ferromagnetic tunnel junction structure as claimed in claim 7, wherein said tunnel barrier layer is made of $Al_2O_3$.

9. The ferromagnetic tunnel junction structure as claimed in claim 1, wherein said tunnel barrier layer is made of an oxide of a conductor having a smaller surface free energy than a ferromagnetic material of said high polarization layer.

10. The ferromagnetic tunnel junction structure as claimed in claim 9, wherein said tunnel barrier layer is made of $Al_2O_3$.

11. The ferromagnetic tunnel junction structure as claimed in claim 9, wherein said tunnel barrier layer has a thickness in the range of 0.4 nanometers to 2.0 nanometers.

12. The ferromagnetic tunnel junction structure as claimed in claim 1, wherein said tunnel barrier layer has a barrier height in the range of 0.4 eV to 5.0 eV.

13. The ferromagnetic tunnel junction structure as claimed in claim 1, wherein said first ferromagnetic layer comprises an additional soft magnetic layer.

14. The ferromagnetic tunnel junction structure as claimed in claim 13, wherein said additional soft magnetic layer includes a premalloy $Ni_xFe_{1-x}(0.35 \leq x \leq 0.8)$.

15. The ferromagnetic tunnel junction structure as claimed in claim 1, wherein said first ferromagnetic layer comprises an additional high polarization layer.

16. The ferromagnetic tunnel junction structure as claimed in claim 15, wherein said additional high polarization layer includes $Co_xFe_{1-x}(0 \leq x < 1)$.

17. The ferromagnetic tunnel junction structure as claimed in claim 15, wherein said additional high polarization layer includes $Ni_xFe_{1-x}(0 \leq x \leq 0.35)$.

18. The ferromagnetic tunnel junction structure as claimed in claim 15, wherein said additional high polarization layer includes at least an intermetallic compound having a prefect spin polarization.

19. The ferromagnetic tunnel junction structure as claimed in claim 18, wherein said intermetallic compound comprises semi-metals.

20. The ferromagnetic tunnel junction structure as claimed in claim 15, wherein said additional high polarization layer has a thickness of not more than 10 nanometers.

21. The ferromagnetic tunnel junction structure as claimed in claim 20, wherein said additional high polarization layer has a thickness of not more than 5 nanometers.

22. The ferromagnetic tunnel junction structure as claimed in claim 1, wherein said first ferromagnetic layer also includes at least an additional high polarization layer and at least an additional soft magnetic layer so that said additional high polarization layer is positioned closer to said tunnel barrier layer than said soft magnetic layer.

23. The ferromagnetic tunnel junction structure as claimed in claim 22, wherein said additional high polarization layer includes $Co_xFe_{1-x}(0 \leq x < 1)$.

24. The ferromagnetic tunnel junction structure as claimed in claim 22, wherein said additional high polarization layer includes $Ni_xFe_{1-x}(0 \leq x \leq 0.35)$.

25. The ferromagnetic tunnel junction structure as claimed in claim 22, wherein said additional high polarization layer includes at least an intermetallic compound having a prefect spin polarization.

26. The ferromagnetic tunnel junction structure as claimed in claim 25, wherein said intermetallic compound comprises semi-metals.

27. The ferromagnetic tunnel junction structure as claimed in claim 22, wherein said additional high polarization layer has a thickness of not more than 10 nanometers.

28. The ferromagnetic tunnel junction structure as claimed in claim 27, wherein said additional high polarization layer has a thickness of not more than 5 nanometers.

29. The ferromagnetic tunnel junction structure as claimed in claim 22, wherein said additional soft magnetic layer includes a permalloy $Ni_xFe_{1-x}(0.35 \leq x \leq 0.8)$.

30. A free layer adjacent a tunnel barrier layer in a ferromagnetic tunnel junction structure, comprising:
at least a high polarization layer of a first NiFe material and at least a soft magnetic layer of a second NiFe material arranged so that said high polarization layer is positioned closer to said tunnel barrier layer than said soft magnetic layer.

31. The free layer as claimed in claim 30, wherein said high polarization layer includes at least an intermetallic compound having a prefect spin polarization.

32. The free layer as claimed in claim 31, wherein said intermetallic compound comprises semi-metals.

33. The free layer as claimed in claim 30, wherein said high polarization layer has a thickness of not more than 10 nanometers.

34. The free layer as claimed in claim 33, wherein said high polarization layer has a thickness of not more than 5 nanometers.

35. The free layer as claimed in claim 30, wherein said high polarization layer has a magnetic moment which is higher than a magnetic moment of cobalt.

36. A ferromagnetic tunnel junction structure comprising:
an anti-ferromagnetic layer;
a first ferromagnetic layer in contact with said anti-ferromagnetic layer;
a tunnel barrier layer in contact with said first ferromagnetic layer;
a second ferromagnetic layer in contact with said tunnel barrier layer so that said tunnel barrier layer is sandwiched between said first and second ferromagnetic layer,
wherein said second ferromagnetic layer includes at least a high polarization layer of a first NiFe material and at least a soft magnetic layer of a second NiFe material so that said high polarization layer is positioned closer to said tunnel barrier layer than said soft magnetic layer.

37. The ferromagnetic tunnel junction structure as claimed in claim 36, wherein said high polarization layer includes at least an intermetallic compound having a prefect spin polarization.

38. The ferromagnetic tunnel junction structure as claimed in claim 37, wherein said intermetallic compound comprises semi-metals.

39. The ferromagnetic tunnel junction structure as claimed in claim 36, wherein said high polarization layer has a thickness of not more than 10 nanometers.

40. The ferromagnetic tunnel junction structure as claimed in claim 39, wherein said high polarization layer has a thickness of not more than 5 nanometers.

41. The ferromagnetic tunnel junction structure as claimed in claim 36, wherein said high polarization layer has a magnetic moment which is higher than a magnetic moment of cobalt.

42. The ferromagnetic tunnel junction structure as claimed in claim 36, wherein said tunnel barrier layer is made of an oxide of a conductor having a smaller surface free energy than a ferromagnetic material of said first ferromagnetic layer.

43. The ferromagnetic tunnel junction structure as claimed in claim 42, wherein said tunnel barrier layer is made of $Al_2O_3$.

44. The ferromagnetic tunnel junction structure as claimed in claim 36, wherein said tunnel barrier layer is made of an oxide of a conductor having a smaller surface free energy than a ferromagnetic material of said high polarization layer.

45. The ferromagnetic tunnel junction structure as claimed in claim 44, wherein said tunnel barrier layer is made of $Al_2O_3$.

46. The ferromagnetic tunnel junction structure as claimed in claim 44, wherein said tunnel barrier layer has a thickness in the range of 0.4 nanometers to 2.0 nanometers.

47. The ferromagnetic tunnel junction structure as claimed in claim 36, wherein said tunnel barrier layer has a barrier height in the range of 0.4 eV to 5.0 eV.

48. The ferromagnetic tunnel junction structure as claimed in claim 36, wherein said second ferromagnetic layer comprises an additional soft magnetic layer.

49. The ferromagnetic tunnel junction structure as claimed in claim 48, wherein said additional soft magnetic layer includes a premalloy $Ni_xFe_{1-x}(0.35 \leq x \leq 0.8)$.

50. The ferromagnetic tunnel junction structure as claimed in claim 48, wherein said second ferromagnetic layer further comprises an additional high polarization layer having a thickness of not more than 10 nanometers.

51. The ferromagnetic tunnel junction structure as claimed in claim 50, wherein said additional high polarization layer has a thickness of not more than 5 nanometers.

52. The ferromagnetic tunnel junction structure as claimed in claim 36, wherein said second ferromagnetic layer also includes at least an additional high polarization layer and at least an additional soft magnetic layer so that said additional high polarization layer is positioned closer to said tunnel barrier layer than said soft magnetic layer.

53. The ferromagnetic tunnel junction structure as claimed in claim 52, wherein said additional high polarization layer includes $Co_xFe_{1-x}(0 \leq x < 1)$.

54. The ferromagnetic tunnel junction structure as claimed in claim 52, wherein said additional high polarization layer includes $Ni_xFe_{1-x}(0 \leq x \leq 0.35)$.

55. The ferromagnetic tunnel junction structure as claimed in claim 52, wherein said additional high polarization layer includes at least an intermetallic compound having a prefect spin polarization.

56. The ferromagnetic tunnel junction structure as claimed in claim 55, wherein said intermetallic compound comprises semi-metals.

57. The ferromagnetic tunnel junction structure as claimed in claim 52, wherein said additional high polarization layer has a thickness of not more than 10 nanometers.

58. The ferromagnetic tunnel junction structure as claimed in claim 57, wherein said additional high polarization layer has a thickness of not more than 5 nanometers.

59. The ferromagnetic tunnel junction structure as claimed in claim 52, wherein said additional soft magnetic layer includes a permalloy $Ni_xFe_{1-x}(0.35 \leq x \leq 0.8)$.

60. A pinned layer in a ferromagnetic tunnel junction structure, comprising:
at least a high polarization layer; and
at least a soft magnetic layer so that said high polarization layer is positioned closer to a tunnel barrier layer of said ferromagnetic tunnel junction structure than said soft magnetic layer, wherein said high polarization layer is of a first NiFe material and said soft magnetic layer is of a second NiFe material.

61. The pinned layer as claimed in claim 60, wherein said high polarization layer includes at least an intermetallic compound having a prefect spin polarization.

62. The pinned layer as claimed in claim 61, wherein said intermetallic compound comprises semi-metals.

63. The pinned layer as claimed in claim 60, wherein said high polarization layer has a thickness of not more than 10 nanometers.

64. The pinned layer as claimed in claim 63, wherein said high polarization layer has a thickness of not more than 5 nanometers.

65. The pinned layer as claimed in claim 60, wherein said high polarization layer has a magnetic moment which is higher than a magnetic moment of cobalt.

66. A ferromagnetic tunnel junction structure comprising:

an anti-ferromagnetic layer;

a first ferromagnetic layer in contact with said anti-ferromagnetic layer;

a tunnel barrier layer in contact with said first ferromagnetic layer; and a second ferromagnetic layer in contact with said tunnel barrier layer so that said tunnel barrier layer is sandwiched between said first and second ferromagnetic layer, wherein said tunnel barrier layer comprises an alumina layer which has a thickness in the range of 0.4 nanometers to 2.0 nanometers and a barrier height in the range of 0.4 eV to 5.0 eV, and wherein said second ferromagnetic layer includes at least a high polarization layer of a first NiFe material and at least a soft magnetic layer of a second NiFe material so that said high polarization layer is positioned closer to said tunnel barrier layer than said soft magnetic layer.

67. The ferromagnetic tunnel junction structure as claimed in claim 66, wherein said high polarization layer includes at least an intermetallic compound having a prefect spin polarization.

68. The ferromagnetic tunnel junction structure as claimed in claim 67, wherein said intermetallic compound comprises semi-metals.

69. The ferromagnetic tunnel junction structure as claimed in claim 66, wherein said high polarization layer has a thickness of not more than 10 nanometers.

70. The ferromagnetic tunnel junction structure as claimed in claim 69, wherein said high polarization layer has a thickness of not more than 5 nanometers.

71. The ferromagnetic tunnel junction structure as claimed in claim 66, wherein said high polarization layer has a magnetic moment which is higher than a magnetic moment of cobalt.

72. The method of forming a tunnel barrier layer on a ferromagnetic layer in a ferromagnetic tunnel junction structure, said method comprising the steps of:

introducing an impurity-free oxygen-containing gas into a vacuum; and exposing a conductive layer on said ferromagnetic layer to said impurity-free oxygen-containing gas to cause a spontaneous oxidation of said conductive layer in a substantive thermal equilibrium state, thereby forming a tunnel barrier layer on said ferromagnetic layer.

73. The method as claim in claim 72, wherein a pure oxygen gas is introduced into said vacuum.

* * * * *